(12) United States Patent
Kim et al.

(10) Patent No.: US 12,341,609 B2
(45) Date of Patent: Jun. 24, 2025

(54) METHOD AND DEVICE FOR PERFORMING COMMUNICATION IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Jinkyu Kang, Gyeonggi-do (KR); Youngbum Kim, Gyeonggi-do (KR); Taehan Bae, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 497 days.

(21) Appl. No.: 17/783,847

(22) PCT Filed: Dec. 7, 2020

(86) PCT No.: PCT/KR2020/017791
§ 371 (c)(1),
(2) Date: Jun. 9, 2022

(87) PCT Pub. No.: WO2021/118192
PCT Pub. Date: Jun. 17, 2021

(65) Prior Publication Data
US 2023/0081776 A1 Mar. 16, 2023

(30) Foreign Application Priority Data
Dec. 13, 2019 (KR) .................. 10-2019-0167136

(51) Int. Cl.
*H04L 1/00* (2006.01)
*H04L 5/00* (2006.01)
(Continued)

(52) U.S. Cl.
CPC .......... *H04L 1/0067* (2013.01); *H04L 5/0051* (2013.01); *H04W 24/08* (2013.01); *H04W 72/23* (2023.01)

(58) Field of Classification Search
CPC .... H04L 1/0067; H04L 5/0051; H04W 72/23; H04W 24/08
See application file for complete search history.

(56) References Cited

U.S. PATENT DOCUMENTS

| 10,165,562 B2 | 12/2018 | Wang et al. |
| 2020/0244285 A1 | 7/2020 | Kim et al. |

(Continued)

FOREIGN PATENT DOCUMENTS

| KR | 1020170109680 | 9/2017 |
| KR | 1020190098727 | 8/2019 |

(Continued)

OTHER PUBLICATIONS

Nokia, Nokia Shanghai Bell, "Summary on Maintenance Related to Rate-Matching in NR", R1-1903464, 3GPP TSG-RAN WG1 #96, Feb. 25,-Mar. 1, 2019, 9 pages.

(Continued)

*Primary Examiner* — Elton Williams
(74) *Attorney, Agent, or Firm* — The Farrell Law Firm, P.C.

(57) ABSTRACT

The disclosure relates to a method of performing communication in a wireless communication system. According to an embodiment of the disclosure, a terminal may receive physical downlink control channel (PDCCH) configuration information and rate matching configuration information from a base station, identify resource elements (REs) overlapping a rate matching resource from among REs included in PDCCH candidates, based on the PDCCH configuration information and the rate matching configuration informa- (Continued)

tion, and monitor a PDCCH candidate including the identified REs from among the PDCCH candidates, based on whether a number of ports of signals transmitted via the rate matching resource exceeds a preset value.

15 Claims, 12 Drawing Sheets

(51) Int. Cl.
 *H04W 24/08* (2009.01)
 *H04W 72/23* (2023.01)

(56) References Cited

U.S. PATENT DOCUMENTS

| | | | |
|---|---|---|---|
| 2020/0382247 A1 | 12/2020 | Kwak et al. | |
| 2021/0084628 A1 | 3/2021 | Kim et al. | |
| 2023/0081776 A1* | 3/2023 | Kim | H04L 5/0051 370/329 |

FOREIGN PATENT DOCUMENTS

| | | |
|---|---|---|
| KR | 1020190028241 | 3/2021 |
| WO | WO 2019/027185 | 2/2019 |

OTHER PUBLICATIONS

Nokia, Nokia Shanghai Bell, "Summary on CRs Related to Rate-Matching in NR", R1-1907702, 3GPP TSG RAN WG1 Meeting #97, May 13-17, 2019, 12 pages.

International Search Report dated Mar. 9, 2021 Issued in counterpart application No. PCT/KR2020/017791, 14 pages.

Qualcomm Incorporated, "Maintenance for PDSCH Rate Matching and TA", R1-1809505, 3GPP TSG RAN WG1 Meeting #94, Aug. 20-24, 2018, 8 pages.

Korean Notice of Allowance dated Mar. 10, 2025 issued in counterpart application No. 10-2019-0167136, 7 pages.

* cited by examiner

METHOD AND DEVICE FOR PERFORMING COMMUNICATION IN WIRELESS COMMUNICATION SYSTEM

PRIORITY

This application is a National Phase Entry of PCT International Application No. PCT/KR2020/017791, which was filed on Dec. 7, 2020, and claims priority to Korean Patent Application No. 10-2019-0167136, which was filed on Dec. 13, 2019, the entire content of each of which is incorporated herein by reference.

TECHNICAL FIELD

The disclosure relates to a method and apparatus for performing communication in a wireless communication system, and more particularly, to a method and apparatus for transmitting a physical downlink control channel (PDCCH).

BACKGROUND ART

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called beyond 4G network communication systems or post long-term evolution (post-LTE) systems. In order to achieve high data rates, the implementation of 5G communication systems in an ultra-high frequency millimeter-wave (mmWave) band (e.g., a 60-gigahertz (GHz) band) is being considered. In order to reduce pathloss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. Also, to improve system networks, for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. Also, for 5G communication systems, advanced coding modulation (ACM) schemes such as hybrid frequency-shift keying (FSK) and quadrature amplitude modulation (QAM) modulation (FQAM) and sliding window superposition coding (SWSC) and enhanced network access schemes such as filter-bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, technology elements such as sensing technology, wired/wireless communication and network infrastructures, service interface technology, and security technology are required, and thus, technologies for inter-object connection, such as sensor network, machine to machine (M2M) communication, or machine-type communication (MTC), have recently been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems (or new radio (NR)) to the IoT. For example, technology such as sensor network, M2M communication, or MTC is implemented by 5G communication technology such as beamforming, MIMO, or array antenna. The application of Cloud-RAN as the above-described big data processing technology may also be an example of convergence of 3eG communication technology and IoT technology.

Because various services may be provided due to the development of wireless communication systems, methods for seamlessly providing these services are required.

DESCRIPTION OF EMBODIMENTS

Technical Problem

Disclosed embodiments are to provide an apparatus and method for effectively providing a service.

Solution to Problem

The disclosure relates to a method of performing communication in a wireless communication system. According to an embodiment of the disclosure, a terminal may receive physical downlink control channel (PDCCH) configuration information and rate matching configuration information from a base station, identify resource elements (REs) overlapping a rate matching resource from among REs included in PDCCH candidates, based on the PDCCH configuration information and the rate matching configuration information, and monitor a PDCCH candidate including the identified REs from among the PDCCH candidates, based on whether a number of ports of signals transmitted via the rate matching resource exceeds a preset value.

Advantageous Effects of Disclosure

According to disclosed embodiments, a service may be effectively provided in a wireless communication system through downlink control channel transmission.

BEST MODE

Figure 1:
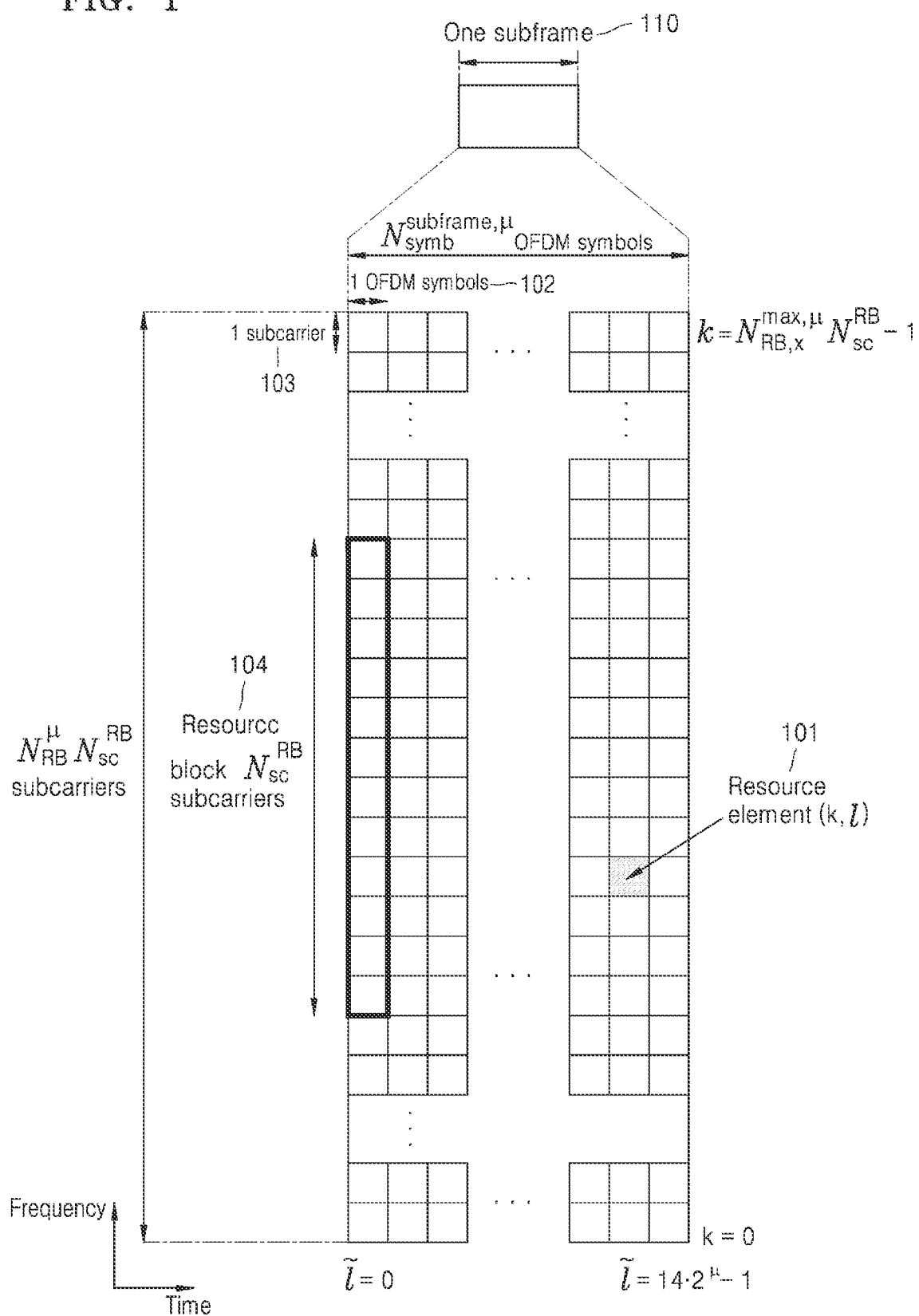
FIG. 1 is a diagram illustrating a basic structure of a time-frequency domain that is a radio resource domain in which data or a control channel is transmitted in a $5^{th}$ generation (5G) system.

A terminal for performing communication in a wireless communication system according to an embodiment of the disclosure includes: a transceiver; and at least one processor, wherein the at least one processor is configured to receive physical downlink control channel (PDCCH) configuration information and rate matching configuration information from a base station, through the transceiver, identify resource elements (REs) overlapping a rate matching resource from among REs included in PDCCH candidates, based on the PDCCH configuration information and the rate matching configuration information, and monitor a PDCCH candidate including the identified REs from among the PDCCH candidates, based on whether a number of ports of signals transmitted via the rate matching resource exceeds a preset value.

The at least one processor may be further configured to, when the number of ports of signals transmitted through the rate matching resource exceeds to the preset value, determine that REs overlapping the rate matching resource from among REs included in the PDCCH candidate are punctured REs, and monitor REs other than the punctured REs from among the REs included in the PDCCH candidate.

The at least one processor may be further configured to determine that REs overlapping the rate matching resource from among REs included in the PDCCH candidate are rate matched REs, and monitor REs other than the rate matched REs from among the REs included in the PDCCH candidate.

The at least one processor may be further configured to, when the number of ports of signals transmitted through the rate matching resource exceeds the preset value, determine that REs having a number of ports exceeding the preset value from among REs overlapping the rate matching resource are punctured REs or rate matched REs, and monitor REs other than the punctured REs or the rate matched REs from among REs included in the PDCCH candidate.

The at least one processor may be further configured to, when the number of ports of signals transmitted through the rate matching resource exceeds the preset value, determine whether REs having a number of ports not exceeding the preset value from among REs of the PDCCH candidate overlap the rate matching resource, and when the REs having the number of ports not exceeding the preset value from among the REs of the PDCCH candidate overlap the rate matching resource, not monitor the PDCCH candidate.

The at least one processor may be further configured to, determine whether a PDCCH signal mapped to the identified REs is a demodulation reference signal (DMRS), when the PDCCH signal mapped to the identified REs is the DMRS and the number of ports of signals transmitted through the rate matching resource exceeds the preset value, determine changed positions of the REs to which the DMRS is mapped, and monitor the DMRS in the REs on the changed positions.

The at least one processor may be further configured to change at least one of a time index and a frequency index indicating positions of the REs to which the DMRS is mapped, according to a preset value.

A base station for performing communication in a wireless communication system according to an embodiment of the disclosure includes: a transceiver; and at least one processor, wherein the at least one processor is configured to identify resource elements (REs) overlapping a rate matching resource from among REs included in PDCCH candidates, determine a PDCCH candidate including the identified REs from among the PDCCH candidates, based on whether a number of ports of signals transmitted via the rate matching resource exceeds a preset value, and transmit a PDCCH signal through the transceiver, based on REs other than the identified REs from among REs included in the PDCCH candidate.

The at least one processor may be further configured to, when the number of ports of signals transmitted through the rate matching resource exceeds the preset value, determine that REs overlapping the rate matching resource from among REs included in the PDCCH candidate are punctured REs, and transmit a PDCCH signal through the transceiver, based on REs other than the punctured REs from among the REs included in the PDCCH candidate.

The at least one processor may be further configured to, when the number of ports of signals transmitted through the rate matching resource exceeds the preset value, determine that REs overlapping the rate matching resource from among REs included in the PDCCH candidate are rate matched REs, and transmit a PDCCH signal through the transceiver, based on REs other than the rate matched REs from among the REs included in the PDCCH candidate.

MODE OF DISCLOSURE

Hereinafter, various embodiments of the disclosure will be described in detail with reference to the accompanying drawings.

In the following description of embodiments of the disclosure, descriptions of techniques that are well known in the art and not directly related to the disclosure are omitted. This is to clearly convey the gist of the disclosure by omitting an unnecessary description.

For the same reason, some elements in the drawings are exaggerated, omitted, or schematically illustrated. In addition, the size of each element does not substantially reflect its actual size. In each drawing, the same or corresponding element is denoted by the same reference numeral.

The advantages and features of the disclosure, and methods of achieving the same, will become apparent with reference to embodiments of the disclosure described below in detail in conjunction with the accompanying drawings. The disclosure may, however, be embodied in many different forms and should not be construed as limited to embodiments of the disclosure set forth herein; rather these embodiments of the disclosure are provided so that this disclosure will be thorough and complete, and will fully convey the scope of the disclosure to one of ordinary skill in the art, and the disclosure is defined only by the accompanying claims. In the specification, the same reference numerals denote the same elements. Also, in the following description of the disclosure, well-known functions or constructions are not described in detail in order to avoid unnecessarily obscuring the gist of the disclosure. The terms used herein are those defined in consideration of functions in the disclosure, and may vary according to the intention of users or operators, precedents, etc. Hence, the terms used herein have to be defined based on the meaning of the terms together with the descriptions throughout the specification.

Hereinafter, a base station is an entity that allocates resources to a terminal and may be at least one of a gNode B, an eNode B, a node B, a base station (BS), a radio access unit, a base station controller, and a node on a network. A terminal may include a user equipment (UE), a mobile station (MS), a cellular phone, a smartphone, a computer, or a multimedia system capable of performing a communication function. In the disclosure, a downlink (DL) denotes a wireless transmission path of a signal transmitted by a base station to a terminal, and an uplink (UL) denotes a wireless transmission path of a signal transmitted by a terminal to a base station. Also, while embodiments of the disclosure are described by using a long-term evolution (LTE) or longer term evolution-advanced (LTE-A) system as an example, the embodiments of the disclosure may also be applied to other communication systems having a similar technical background or channel form. For example, $5^{th}$ generation (5G) new radio (NR) mobile communication technology developed after LTE-A may belong thereto, and hereinafter, 5G may be indicated as a concept including existing LTE, LTE-A, and other similar services. Also, the embodiments of the disclosure may be applied to other communication systems through some modifications without departing from the scope of the disclosure by the judgment of one of ordinary skill in the art.

In this case, it will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for implementing the functions specified in the flowchart block(s). Because these computer program instructions may also be stored in a computer-executable or computer-readable memory that may direct the computer or other programmable data processing equipment to function in a particular manner, the instructions stored in the computer-executable or computer-readable memory may produce an article of manufacture including instruction means for implementing the functions specified in the flowchart block(s). Because the computer program instructions may also be loaded onto a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart block(s).

Also, each block may represent a module, segment, or portion of code, which includes one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, according to the functionality involved.

The term "~unit" used in the present embodiment refers to a software or hardware component, such as a field-programmable gate array (FPGA) or an application-specific integrated circuit (ASIC), which performs certain tasks. However, the term "~unit" does not mean to be limited to software or hardware. A "~unit" may be configured to be in an addressable storage medium or may be configured to operate one or more processors. Thus, a "~unit" includes, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~units" may be combined into fewer components and "~units", or may be further separated into additional components and "~units". Furthermore, components and "~units" may be implemented to operate one or more central processing units (CPUs) in a device or a secure multimedia card. Also, a "~unit" in an embodiment may include one or more processors.

A wireless communication system has evolved from an initial system that provides a voice-oriented service to a broadband wireless communication system that provides a high-speed and high-quality packet data service, using communication standards such as 3d generation partnership project (3GPP) high speed packet access (HSPA), long-term evolution (LTE) or evolved universal terrestrial radio access (E-UTRA), LTE-advanced (LTE-A), LTE-Pro, 3GPP2 high rate packet data (HRPD), ultra-mobile broadband (UMB), and the institute of electrical and electronics engineers (IEEE) 802.16e.

An LTE system, which is a representative example of a broadband wireless communication system, employs an orthogonal frequency division multiplexing (OFDM) scheme for a downlink (DL), and employs a single carrier frequency division multiple access (SC-FDMA) scheme for an uplink (UL). The uplink is a radio link through which a terminal (e.g., a user equipment (UE) or a mobile station (MS)) transmits data or a control signal to a base station (e.g., an eNode B or a base station (BS)), and the downlink is a radio link through which the base station transmits data or a control signal to the terminal. In the multiple access scheme, time-frequency resources for carrying data or control information may be allocated and operated in a manner to prevent overlapping of the resources, i.e., to establish orthogonality between users so as to identify data or control information of each user.

As post-LTE communication systems, 5G systems should be able to freely reflect various requirements of users and service providers, and thus, services simultaneously satisfying the various requirements should be supported. Services considered for the 5G systems include enhanced mobile broadband (eMBB), massive machine-type communication (mMTC), and ultra-reliability low-latency communication (URLLC) services.

The eMBB aims to provide a higher data rate than a data rate supported by the existing LTE, LTE-A, or LTE-Pro. For example, in a 5G communication system, the eMBB should be able to provide a peak data rate of 20 Gbps in a downlink and a peak data rate of 10 Gbps in an uplink from the viewpoint of one base station. Also, the 5G communication system should be able to provide an increased user-perceived data rate of a terminal while providing the peak data rate. In order to satisfy such requirements, in the 5G communication system, various transmission and reception technologies including a further enhanced MIMO transmission technology need to be improved. Furthermore, an LTE system transmits a signal by using a maximum transmission bandwidth of 20 megahertz (MHz) in a frequency band of 2 gigahertz (GHz). In contrast, the 5G communication system transmits a signal by using a frequency bandwidth wider than 20 MHz in a frequency band of 3 to 6 GHz or more, and thus may satisfy the data rate requirements necessary for the 5G communication system.

Furthermore, the mMTC is considered to support application services such as Internet of Things (IoT) in the 5G communication system. In order for mMTC to efficiently provide the IoT, access by many terminals within a single cell, coverage improvement of a terminal, an increased battery time, reduced costs of a terminal, etc. are required. The IoT is attached to various sensors and various devices to provide a communication function, and thus, should be able to support many terminals (e.g., 1,000,000 terminals/km²) within a cell. Furthermore, because a terminal supporting mMTC is likely to be located in a shaded area that a cell does not cover such as in the basement of a building, wider coverage than other services provided by the 5G communication system may be required. Because the terminal supporting mMTC should include a cheap terminal and it is difficult to replace a battery of the terminal frequently, a very long battery life time (e.g., 10-15 years) may be required.

Lastly, the URLLC is a cellular-based wireless communication service used for mission-critical purposes. For example, the URLLC may be used in remote control of robots or machinery, industrial automation, unmanned aerial vehicles, remote health care, emergency alert, etc. Accordingly, communication provided by the URLLC should provide ultra-low latency and ultra-high reliability. For example, services supporting URLLC should meet an air interface latency of less than 0.5 milliseconds and simultaneously have a requirement of a packet error rate of $10^{-5}$ or less. Accordingly, for services supporting URLLC, the 5G system should provide a transmission time interval (TTI) less than that of other services, and a design for broad resource allocation in a frequency band in order to ensure the reliability of a communication link may be required.

The three services of 5G, i.e., the eMBB, the URLLC, and the mMTC, may be multiplexed and transmitted in one system. In this case, in order to satisfy different requirements of the services, different transmission and reception schemes and transmission/reception parameters may be used between the services. However, 5G is not limited to the above three services.

A frame structure of a 5G system will be described in more detail with reference to the drawings.

FIG. 1 is a diagram illustrating a basic structure of a time-frequency domain that is a radio resource domain in which data or a control channel is transmitted in a 5G system.

In FIG. 1, a horizontal axis represents a time domain, and a vertical axis represents a frequency domain. A basic resource unit in a time-frequency domain is a resource element (RE) 101, and may be defined by one orthogonal frequency division multiplexing (OFDM) symbol 102 along a time axis and one subcarrier 103 along a frequency axis. In the frequency domain, $N_{SC}^{RB}$ (e.g., 12) consecutive REs may constitute one resource block (RB) 104.

Figure 2:
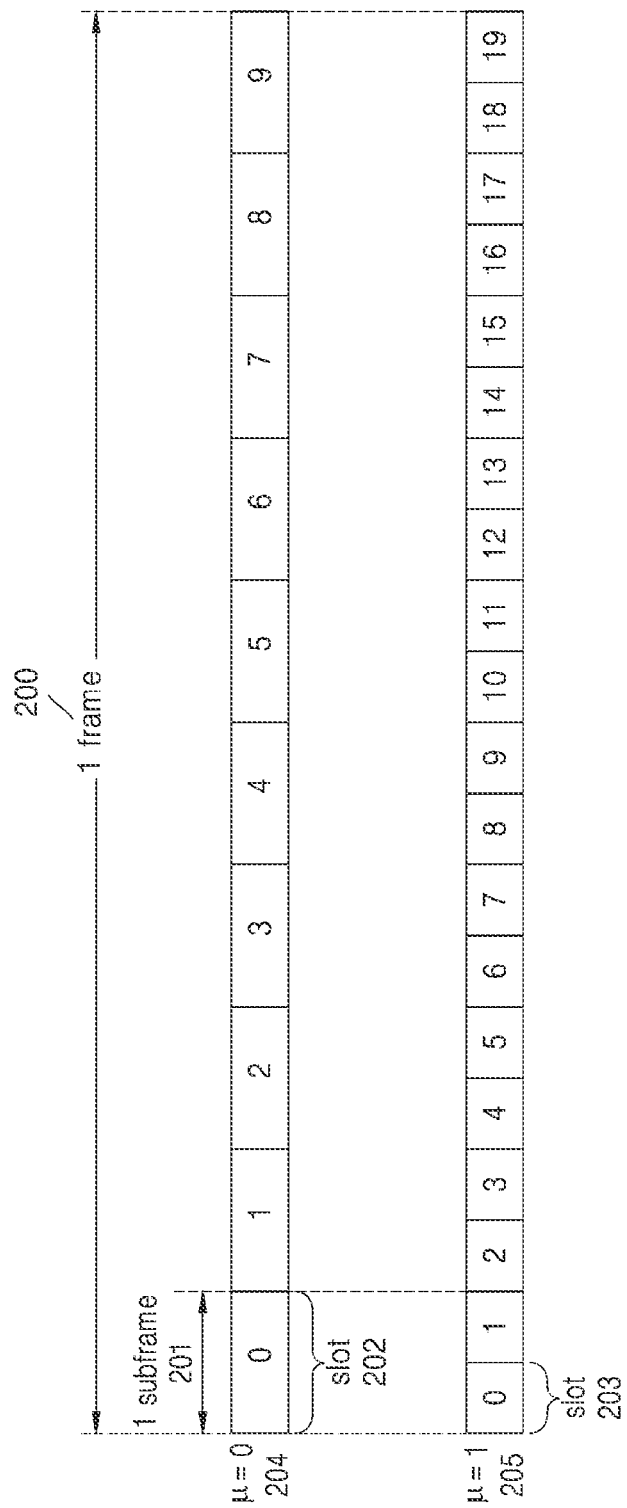
FIG. 2 is a diagram illustrating a slot structure considered in a 5G system.

FIG. 2 is a diagram illustrating a slot structure considered in a 5G system.

In FIG. 2, structures of a frame 200, a subframe 201, and a slot 202 are illustrated. One frame 200 may be defined as 10 ms. One subframe 201 may be defined as 1 ms, and thus, one frame 200 may include a total of 10 subframes 201. One slot 202 or 203 may be defined as 14 OFDM symbols (i.e., the number of symbols per slot $N_{symb}^{slot}=14$). One subframe 201 may include one or more slots 202 or 203, and the number of slots 202 or 203 per subframe 201 may vary according a subcarrier spacing configuration value μ (204 and 205). FIG. 2 illustrates a case where the subcarrier spacing configuration value μ is 0 (204) and a case where the subcarrier spacing configuration value μ is 1 (205). In the case of μ=0 (204), one subframe 201 may include one slot 202, and in the case of μ=1 (205), one subframe 201 may include two slots 203. That is, the number of slots per subframe $N_{slot}^{subframe,\mu}$ may vary according to the subcarrier spacing configuration value μ, and the number of slots per frame $N_{slot}^{frame,\mu}$ may accordingly vary. $N_{slot}^{subframe,\mu}$ and $N_{slot}^{frame,\mu}$ according to each subcarrier spacing configuration value μ may be defined as in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

A bandwidth part (BWP) configuration in a 5G communication system will now be described in detail with reference to FIG. 3.

Figure 3:
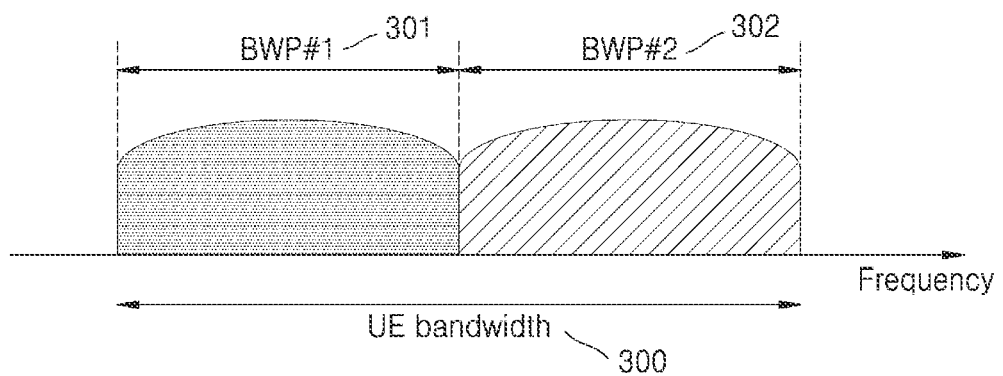
FIG. 3 is a diagram illustrating a bandwidth part (BWP) configuration in a 5G communication system.

FIG. 3 is a diagram illustrating a BWP configuration in a 5G communication system.

In FIG. 3, a user equipment (UE) bandwidth 300 includes two BWPs, that is, a BWP #1 301 and a BWP #2 302. A base station may configure one or more BWPs in a UE, and may configure the following information for each BWP.

TABLE 2

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

However, the disclosure is not limited thereto, and various BWP-related parameters in addition to the configuration information may be configured for the UE. The base station may transmit the information to the UE through higher layer signaling, for example, radio resource control (RRC) signaling. Also, at least one of the configured one or more BWPs may be activated. Whether the configured BWP is activated may be semi-statically transmitted from the base station to the UE through RRC signaling or may be dynamically transmitted through downlink control information (DCI).

According to some embodiments of the disclosure, the UE before RRC connection may be configured with an initial BWP for initial connection through a master information block (MIB) from the base station. In more detail, the UE may receive configuration information for a search space and a control resource set (CORESET) where a physical downlink control channel (PDCCH) may be transmitted in order to receive system information (e.g., remaining system information (RMSI) or system information block 1 (SIB1)) required for initial access through the MIB in an initial access stage. An identifier (ID) of the control resource set and the search space configured through the MIB may be considered as 0. The base station may notify configuration information such as frequency allocation information, time allocation information, and a numerology for a control resource set #0 through the MIB to the UE. Also, the base station may notify configuration information for a monitoring period and an occasion for the control resource set #0, that is, configuration information for a search space #0, through the MIB to the UE. The UE may consider a frequency domain configured as the control resource set #0 obtained from the MIB as the initial BWP for initial access. In this case, an ID of the initial BWP may be considered as 0.

A configuration of a BWP supported by 5G may be used for various purposes.

According to some embodiments, when a bandwidth supported by a UE is smaller than a system bandwidth, a base station may support the UE through a BWP configuration. For example, the base station may configure a frequency position (configuration information 2) of a BWP in the UE so that the UE transmits and receives data at a specific frequency position within the system bandwidth.

Also, according to some embodiments, the base station may configure a plurality of BWPs in the UE in order to support different numerologies. For example, in order to support data transmission and reception using both a subcarrier spacing of 15 kHz and a subcarrier spacing of 30 kHz to and from a certain UE, the base station may configure two BWPs as subcarrier spacings of 15 kHz and 30 kHz. Different BWPs may be frequency division multiplexed, and when data is to be transmitted and received at a specific subcarrier spacing, a BWP configured as the specific subcarrier spacing may be activated.

Also, according to some embodiments, the base station may configure BWPs having different bandwidths in the UE in order to reduce power consumption of the UE. For example, when the UE supports a very large bandwidth, for example, a bandwidth of 100 MHz, and always transmits and receives data in the bandwidth, vary high power consumption may occur. In particular, monitoring an unnecessary downlink control channel by using a large bandwidth of 100 MHz when there is no traffic may be very inefficient in terms of power consumption. In order to reduce power consumption of the UE, the base station may configure a BWP having a relatively small bandwidth, for example, a BWP of 20 MHz, in the UE. The UE may perform a monitoring operation in the BWP of 20 MHz when there is no traffic, and the UE may transmit and receive data in the BWP of 100 MHz according to an indication of the base station when data is generated.

In a method of configuring a BWP, UEs before RRC connection may receive configuration information regarding an initial BWP through an MIB in an initial access stage. In more detail, a UE may be configured with a control resource set (CORESET) for a downlink control channel via which downlink control information (DCI) for scheduling a system information block (SIB) may be transmitted, from an MIB of a physical broadcast channel (PBCH). A bandwidth of the control resource set configured through the MIB may be considered as an initial BWP, and the UE may receive a physical downlink shared channel (PDSCH) via which the SIB is transmitted through the configured initial BWP. The initial BWP may be used for other system information (OSI), paging, and random access as well as for reception of the SIB.

A synchronization signal (SS)/physical broadcast channel (PBCH) block in 5G will now be described.

An SS/PBCH block may refer to a physical layer channel block including a primary SS (PSS), a secondary SS (SSS), and a PBCH, which are specifically defined as follows.

PSS: a reference signal for downlink time/frequency synchronization, which provides some formation of a cell ID.

SSS: a reference signal for downlink time/frequency synchronization, which provides the remaining information of the cell ID which is not provided by the PSS. Additionally, the SSS may serve as another reference signal for demodulation of a PBCH.

PBCH: a channel for providing essential system information required for transmission or reception of a data channel and a control channel for a UE. The essential system information may include search space-related control information indicating radio resource mapping information of the control channel, and scheduling control information for a separate data channel that transmits system information.

SS/PBCH block: a SS/PBCH block is a combination of a PSS, an SSS, and a PBCH. One or more SS/PBCH blocks may be transmitted within 5 ms, and each of the transmitted SS/PBCH blocks may be distinguished by an index.

A UE may detect a PSS and an SSS in an initial access stage, and may decode a PBCH. The UE may obtain an MIB from the PBCH, and may be configured with a control resource set (CORESET) #0 (which may correspond to a control resource set having a control resource set index of 0) from the MIB. The UE may monitor the control resource set #0 by assuming that a selected SS/PBCH block and a demodulation reference signal (DMRS) transmitted in the control resource set #0 are quasi-co-located (QCLed). The UE may receive system information as downlink control information transmitted in the control resource set #0. The UE may obtain random-access-channel (RACH)-related configuration information required for initial access from the received system information. The UE may transmit a physical RACH (PRACH) to a base station in consideration of a selected SS/PBCH index, and the base station receiving the PRACH may obtain information about the SS/PBCH block index selected by the UE. The base station may know that the UE selects a block from among individual SS/PBCH blocks and monitors the control resource set #0 associated with the selected block.

Downlink control information (DCI) in a 5G system will now be described in detail.

In a 5G system, scheduling information for uplink data (or physical uplink shared channel (PUSCH)) or downlink data (or physical downlink shared channel (PDSCH)) is transmitted from a base station to a UE through DCI. The UE may monitor a fallback DCI format and a non-fallback DCI format for a PUSCH or a PDSCH. The fallback DCI format may include a fixed field predefined between the base station and the UE, and the non-fallback DCI format may include a configurable field.

The DCI may be transmitted through a PDCCH through channel coding and modulation processes. A cyclic redundancy check (CRC) may be attached to a payload of a DCI message, and may be scrambled by a radio network temporary identifier (RNTI) that corresponds to an ID of the UE. Different RNTIs may be used depending on the purpose of the DCI message, e.g., UE-specific data transmission, a power control command, or a random access response. That is, an RNTI is not explicitly transmitted but is included in a CRC calculation process. Upon receiving the DCI message transmitted on the PDCCH, the UE may identify the CRC by using the allocated RNTI, and may recognize that the DCI message is transmitted to the UE when the CRC is correct.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying a slot format indicator (SFI) may be scrambled by an SFI-RNTI. DCI for notifying a transmit power control (TPC) may be scrambled by a TPC-RNTI. DCI for scheduling a UE-specific PDSCH or PUSCH may be scrambled by a cell RNTI (C-RNTI).

DCI format 0_0 may be used as fallback DCI for scheduling a PUSCH, in which a CRC may be scrambled by a C-RNTI. The DCI format 0_0 in which the CRC is scrambled by the C-RNTI may include, for example, the following information.

TABLE 3

- Identifier for DCI formats — 1 bit
  - The value of this bit field is always set to 0, indicating an UL DCI format
- Frequency domain resource assignment — $[\log_2(N_{RB}^{UL,BWP}(N_{RB}^{UL,BWP}+1)/2)]$ bits
  where $N_{RB}^{UL,BWP}$ is defined in subclause 7.3.1.0
  - For PUSCH hopping with resource allocation type 1:
    - $N_{UL\_hop}$ MSB bits are used to indicate the frequency offset according to Subclause 6.3 of [6, TS 38.214], where $N_{UL\_hop}=1$ if the higher layer parameter frequencyHoppingOffsetLists contains two offset values and $N_{UL\_hop}=2$ if the higher layer parameter frequencyHoppingOffsetLists contains four offset values
    - $[\log_2(N_{RB}^{UL,BWP}(N_{RB}^{UL,BWP}+1)/2)] - N_{UL\_hop}$ bits provides the frequency domain resource allocation according to Subclause 6.1.2.2.2 of [6, TS 38.214]
  - For non-PUSCH hopping with resource allocation type 1:
    - $[\log_2(N_{RB}^{UL,BWP}(N_{RB}^{UL,BWP}+1)/2)]$ bits provides the frequency domain resource allocation according to Subclause 6.1.2.2.2 of [6, TS 38.214]
- Time domain resource assignment — 4 bits as defined in Subclause 6.1.2.1 of [6, TS 38.214]
- Frequency hopping flag — 1 bit according to Table 7.3.1.1.1-3, as defined in Subclause 6.3 of [6, TS 38.214]
- Modulation and coding scheme — 5 bits as defined in Subclause 6.1.4.1 of [6, TS 38.214]
- New data indicator — 1 bit
- Redundancy version — 2 bits as defined in Table 7.3.1.1.1-2
- HARQ process number — 4 bits
- TPC command for scheduled PUSCH — 2 bits as defined in Subclause 7.1.1 of [5, TS 38.213]
- Padding bits, if required.
- UL/SUL indicator — 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
  - If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
  - If the UL/SUL indicator is not present in DCI format 0_0 and pucch-Config is configured, the corresponding PUSCH scheduled by the DCI format 0_0 is for the UL or SUL for which high layer parameter pucch-Config is configured.
  - If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used as non-fallback DCI for scheduling a PUSCH, in which a CRC may be scrambled by a C-RNTI. The DCI format 0_1 in which the CRC is scrambled by the C-RNTI may include, for example, the following information.

TABLE 4

- Identifier for DCI formats—1 bit
  - The value of this bit field is always set to 0, indicating an UL DCI format
- Carrier indicator—0 or 3 bits, as defined in Subclause 10.1 of [5, TS38.213].
- UL/SUL indicator—0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.
- Bandwidth part indicator—0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where
  - $n_{BWP} = n_{BWP,RRC} + 1$ if $n_{BWP,RRC} \leq 3$, in which case the bandwidth part indicator is equivalent to the ascending order of the higher layer parameter BWP-Id;
  - otherwise $n_{BWP} = n_{BWP,RRC}$, in which case the bandwidth part indicator is defined in Table 7.3.1.1.2-1;
  If a UE does not support active BWP change via DCI, the UE ignores this bit field.
- Frequency domain resource assignment—number of bits determined by the following, where $N_{RB}^{UL,BWP}$ is the size of the active UL bandwidth part:
  - $N_{RBG}$ bits if only resource allocation type 0 is configured, where $N_{RBG}$ is defined in Subclause 6.1.2.2.1 of [6, TS 38.214],
  - $\lceil \log_2(N_{RB}^{UL,BWP}(N_{RB}^{UL,BWP} + 1)/2) \rceil$ bits if only resource allocation type 1 is configured, or $\max(\lceil \log_2(N_{RB}^{UL,BWP}(N_{RB}^{UL,BWP} + 1/2) \rceil, N_{RBG})+1$ bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  - For resource allocation type 0, the $N_{RBG}$ LSBs provide the resource allocation as defined in Subclause 6.1.2.2.1 of [6, TS 38.214].
  - For resource allocation type 1, the $\lceil \log_2(N_{RB}^{UL,BWP}(N_{RB}^{UL,BWP} + 1/2) \rceil$ LSBs provide the resource allocation as follows:
    - For PUSCH hopping with resource allocation type 1:
      - $N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values
      - $\lceil \log_2(N_{RB}^{UL,BWP}(N_{RB}^{UL,BWP} + 1/2) \rceil - N_{UL\_hop}$ bits provides the frequency domain resource allocation according to Subclause 6.1.2.2.2 of [6, TS 38.214]
    - For non-PUSCH hopping with resource allocation type 1:
      - $\lceil \log_2(N_{RB}^{UL,BWP}(N_{RB}^{UL,BWP} + 1/2) \rceil$ bits provides the frequency domain resource allocation according to Subclause 6.1.2.2.2 of [6, TS 38.214]
  If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
- Time domain resource assignment—0, 1, 2, 3, or 4 bits as defined in Subclause 6.1.2.1 of [6, TS38.214]. The bitwidth for this field is determined as $\lceil \log_2(I) \rceil$ bits, where I is the number of entries in the higher layer parameter pusch-TimeDomainAllocationList if the higher layer parameter is configured; otherwise I is the number of entries in the default table.
- Frequency hopping flag—0 or 1 bit:
  - 0 bit if only resource allocation type 0 is configured or if the higher layer parameter frequencyHopping is not configured;
  - 1 bit according to Table 7.3.1.1.1-3 otherwise, only applicable to resource allocation type 1, as defined in Subclause 6.3 of [6, TS 38.214].
- Modulation and coding scheme—5 bits as defined in Subclause 6.1.4.1 of [6, TS 38.214]
- New data indicator—1 bit
- Redundancy version—2 bits as defined in Table 7.3.1.1.1-2
- HARQ process number—4 bits
- 1$^{st}$ downlink assignment index—1 or 2 bits:
  - 1 bit for semi-static HARQ-ACK codebook;
  - 2 bits for dynamic HARQ-ACK codebook.
- 2$^{nd}$ downlink assignment index—0 or 2 bits:
  - 2 bits for dynamic HARQ-ACK codebook with two HARQ-ACK sub-codebooks;
  - 0 bit otherwise.
- TPC command for scheduled PUSCH—2 bits as defined in Subclause 7.1.1 of [5, TS38.213]

- SRS resource indicator $- \left\lceil \log_2 \left( \sum_{k=1}^{\min\{L_{max}, N_{SRS}\}} \binom{N_{SRS}}{k} \right) \right\rceil$ or $\lceil \log_2(N_{SRS}) \rceil$ bits,

TABLE 4-continued where $N_{SRS}$ is the number of configured SRS resources in the SRS resource set associated with the higher layer parameter usage of value 'codeBook' or 'non Code Book',

- $\left\lceil \log_2\left( \sum_{k=1}^{min\{L_{max}, N_{SRS}\}} \binom{N_{SRS}}{k} \right) \right\rceil$ bits according to Table 7.3.1.1.2–28/29/30/31 if the higher layer parameter txConfig = nonCodeBook, where $N_{SRS}$ is the number of configured SRS resources in the SRS resource set associated with the higher layer parameter usage of value 'nonCodeBook' and
  - if UE supports operation with with maxMIMO-Layers and the higher layer parameter maxMIMO-Layers of PUSCH-ServingCellConfig of the serving cell is configured, $L_{max}$ is given by that parameter
  - otherwise, $L_{max}$ is given by the maximum number of layers for PUSCH supported by the UE for the serving cell for non-codebook based operation.
- $\lceil \log_2(N_{RS}) \rceil$ bits according to Tables 7.3.1.1.2-32 if the higher layer parameter txConfig = codebook, where $N_{SRS}$ is the number of configured SRS resources in the SRS resource set associated with the higher layer parameter usage of value 'codeBook'.
- Precoding information and number of layers—number of bits determined by the following:
  - 0 bits if the higher layer parameter txConfig = nonCodeBook;
  - 0 bits for 1 antenna port and if the higher layer parameter txConfig = codebook;
  - 4, 5, or 6 bits according to Table 7.3.1.1.2-2 for 4 antenna ports, if txConfig = codebook, and according to whether transform precoder is enabled or disabled, and the values of higher layer parameters maxRank, and codebookSubset;
  - 2, 4, or 5 bits according to Table 7.3.1.1.2-3 for 4 antenna ports, if txConfig = codebook, and according to whether transform precoder is enabled or disabled, and the values of higher layer parameters maxRank, and codebookSubset;
  - 2 or 4 bits according to Table 7.3.1.1.2-4 for 2 antenna ports, if txConfig = code book, and according to whether transform precoder is enabled or disabled, and the values of higher layer parameters maxRank and codebookSubset;
  - 1 or 3 bits according to Table 7.3.1.1.2-5 for 2 antenna ports, if txConfig = code book, and according to whether transform precoder is enabled or disabled, and the values of higher layer parameters maxRank and codebookSubset.
- Antenna ports—number of bits determined by the following
  - 2 bits as defined by Tables 7.3.1.1.2-6, if transform precoder is enabled, dmrs-Type=1, and maxLength=1;
  - 4 bits as defined by Tables 7.3.1.1.2-7, if transform precoder is enabled, dmrs-Type=1, and maxLength=2;
  - 3 bits as defined by Tables 7.3.1.1.2-8/9/10/11, if transform precoder is disabled, dmrs-Type=1, and maxLength=1, and the value of rank is determined according to the SRS resource indicator field if the higher layer parameter txConfig = nonCodebook and according to the Precoding information and number of layers field if the higher layer parameter txConfig = codebook;
  - 4 bits as defined by Tables 7.3.1.1.2-12/13/14/15, if transform precoder is disabled, dmrs-Type=1, and maxLength=2, and the value of rank is determined according to the SRS resource indicator field if the higher layer parameter txConfig = nonCodebook and according to the Precoding information and number of layers field if the higher layer parameter txConfig = codebook;
  - 4 bits as defined by Tables 7.3.1.1.2-16/17/18/19, if transform precoder is disabled, dmrs-Type=2, and maxLength=1, and the value of rank is determined according to the SRS resource indicator field if the higher layer parameter txConfig = nonCodebook and according to the Precoding information and number of layers field if the higher layer parameter txConfig = codebook;
  - 5 bits as defined by Tables 7.3.1.1.2-20/21/22/23, if transform precoder is disabled, dmrs-Type=2, and maxLength=2, and the value of rank is determined according to the SRS resource indicator field if the higher layer parameter txConfig = nonCodebook and according to the Precoding information and number of layers field if the higher layer parameter txConfig = codebook.

where the number of CDM groups without data of values 1, 2, and 3 in Tables 7.3.1.1.2-6 to 7.3.1.1.2-23 refers to CDM groups {0}, {0,1}, and {0, 1,2} respectively.
If a UE is configured with both dmrs-UplinkForPUSCH-MappingTypeA and dmrs-UplinkForPUSCH-MappingTypeB, the bitwidth of this field equals max{$x_A$,$x_B$}, where $x_A$ is the "Antenna ports" bitwidth derived according to dmrs-UplinkForPUSCH-MappingTypeA and $x_B$ is the "Antenna ports" bitwidth derived according to dmrs-UplinkForPUSCH-MappingTypeB. A number of |$x_A$-$x_B$| zeros are padded in the MSB of this field, if the mapping type of the PUSCH corresponds to the smaller value of $x_A$ and $x_B$.
- SRS request—2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
- CSI request (Channel State information; CSI)—0, 1, 2, 3, 4, 5, or 6 bits determined by higher layer parameter reportTriggerSize.
- CBG transmission information (CBGTI)—0 bit if higher layer parameter codeBlockGroupTransmission for PDSCH is not configured, otherwise, 2, 4, 6, or 8 bits determined by higher layer parameter maxCodeBlockGroupsPerTransportBlock for PUSCH.

TABLE 4-continued

- PTRS-DMRS association ( Phase Tracking Reference Signal)-
  (Demodulation Reference Signal)—number of bits determined as follows
  - 0 bit if PTRS-UplinkConfig is not configured and transform precoder is disabled,
    or if transform precoder is enabled, or if maxRank=1;
  - 2 bits otherwise, where Table 7.3.1.1.2-25 and 7.3.1.1.2-26 are used to indicate
    the association between PTRS port(s) and DMRS port(s) for transmission of one
    PT-RS port and two PT-RS ports respectively, and the DMRS ports are indicated
    by the Antenna ports field.
  If "Bandwidth part Indicator" field indicates a bandwidth part other than the active
  bandwidth part and the "PTRS-DMRS association" field is present for the indicated
  bandwidth part but not present for the active bandwidth part, the UE assumes the
  "PTRS-DMRS association" field is not present for the indicated bandwidth part.
- beta_offset indicator—0 if the higher layer parameter betaOffsets = semiStatic;
  otherwise 2 bits as defined by Table 9.3-3 in [5, TS 38.213].
- DMRS sequence initialization—0 bit if transform precoder is enabled; 1 bit if transform
  precoder is disabled.
- UL-SCH indicator—1 bit. A value of "1" indicates UL-SCH shall be transmitted on
  the PUSCH and a value of "0" indicates UL-SCH shall not be transmitted on the
  PUSCH. Except for DCI format 0_1 with CRC scrambled by SP-CSI-RNTI, a UE is
  not expected to receive a DCI format 0_1 with UL-SCH indicator of "0" and CSI
  request of all zero(s).

DCI format 1_0 may be used as fallback DCI for scheduling a PDSCH, in which a CRC may be scrambled by a C-RNTI. The DCI format 1_0 in which the CRC is scrambled by the C-RNTI may include, for example, the following information.

TABLE 5

- Identifier for DCI formats — 1 bits
  - The value of this bit field is always set to 1, indicating a DL DCI format
- Frequency domain resource assignment — $[\log_2(N_{RB}^{DL,BWP}(N_{RB}^{DL,BWP}+1)/2)]$ bits where
  $N_{RB}^{DL,BWP}$ is given by subclause 7.3.1.0
If the CRC of the DCI format 1_0 is scrambled by C-RNTI and the "Frequency domain
resource assignment" field are of all ones, the DCI format 1_0 is for random access
procedure initiated by a PDCCH order, with all remaining fields set as follows:
- Random Access Preamble index — 6 bits according to ra-PreambleIndex in Subclause
  5.1.2 of [8, TS38.321]
- UL/SUL indicator — 1 bit. If the value of the "Random Access Preamble index" is not
  all zeros and if the UE is configured with supplementaryUplink in ServingCellConfig in
  the cell, this field indicates which UL carrier in the cell to transmit the PRACH according
  to Table 7.3.1.1.1-1; otherwise, this field is reserved
- SS/PBCH index — 6 bits. If the value of the "Random Access Preamble index" is not
  all zeros, this field indicates the SS/PBCH that shall be used to determine the RACH
  occasion for the PRACH transmission; otherwise, this field is reserved.
- PRACH Mask index — 4 bits. If the value of the "Random Access Preamble index" is
  not all zeros, this field indicates the RACH occasion associated with the SS/PBCH
  indicated by "SS/PBCH index" for the PRACH transmission, according to Subclause 5.1.1
  of [8, TS38.321]; otherwise, this field is reserved
- Reserved bits — 10 bits
Otherwise, all remaining fields are set as follows:
- Time domain resource assignment — 4 bits as defined in Subclause 5.1.2.1 of [6, TS 38.214]
- VRB-to-PRB mapping — 1 bit according to Table 7.3.1.2.2-5
- Modulation and coding scheme — 5 bits as defined in Subclause 5.1.3 of [6, TS 38.214]
- New data indicator — 1 bit
- Redundancy version — 2 bits as defined in Table 7.3.1.1.1-2
- HARQ process number — 4 bits
- Downlink assignment index — 2 bits as defined in Subclause 9.1.3 of [5, TS 38.213],
  as counter DAI
- TPC command for scheduled PUCCH — 2 bits as defined in Subclause 7.2.1 of
  [5, TS 38.213]
- PUCCH resource indicator — 3 bits as defined in Subclause 9.2.3 of [5, TS 38.213]
- PDSCH-to-HARQ_feedback timing indicator — 3 bits as defined in Subclause 9.2.3 of
  [5, TS38.213]

DCI format 1_1 may be used as non-fallback DCI for scheduling a PDSCH, in which a CRC may be scrambled by a C-RNTI. The DCI format 1_1 in which the CRC is scrambled by the C-RNTI may include, for example, the following information.

TABLE 6

- Identifier for DCI formats — 1 bits
  - The value of this bit field is always set to 1, indicating a DL DCI format
- Carrier indicator — 0 or 3 bits as defined in Subclause 10.1 of [5, TS 38.213].
- Bandwidth part indicator — 0, 1 or 2 bits as determined by the number of DL BWPs $n_{BWP,RRC}$ configured by higher layers, excluding the initial DL bandwidth part. The bitwidth for this field is determined as $[\log_2(n_{BWP})]$ bits, where
  - $n_{BWP} = n_{BWP,RRC} +1$ if $n_{BWP,RRC} \leq 3$, in which case the bandwidth part indicator is equivalent to the ascending order of the higher layer parameter BWP-Id;
  - otherwise $n_{BWP} = n_{BWP,RRC}$, in which case the bandwidth part indicator is defined in Table 7.3.1.1.2-1;
  If a UE does not support active BWP change via DCI, the UE ignores this bit field.
- Frequency domain resource assignment — number of bits determined by the following, where $N_{RB}^{DL,BWP}$ is the size of the active DL bandwidth part:
  - $N_{RBG}$ bits if only resource allocation type 0 is configured, where $N_{RBG}$ is defined in Subclause 5.1.2.2.1 of [6, TS38.214],
  - $[\log_2(N_{RB}^{DL,BWP}(N_{RB}^{DL,BWP} +1)/2)]$ bits if only resource allocation type 1 is configured, or
  - $\max([\log_2(N_{RB}^{DL,BWP}(N_{RB}^{DL,BWP} +1)/2)], N_{RBG})+1$ bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  - For resource allocation type 0, the $N_{RBG}$ LSBs provide the resource allocation as defined in Subclause 5.1.2.2.1 of [6, TS 38.214].
  - For resource allocation type 1, the $[\log_2(N_{RB}^{DL,BWP}(N_{RB}^{DL,BWP} +1)/2)]$ LSBs provide the resource allocation as defined in Subclause 5.1.2.2.2 of [6, TS 38.214]
  If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
- Time domain resource assignment — 0, 1, 2, 3, or 4 bits as defined in Subclause 5.1.2.1 of [6, TS 38.214]. The bitwidth for this field is determined as $[\log_2(I)]$ bits, where I is the number of entries in the higher layer parameter pdsch-TimeDomainAllocationList if the higher layer parameter is configured; otherwise I is the number of entries in the default table.
- VRB-to-PRB mapping — 0 or 1 bit:
  - 0 bit if only resource allocation type 0 is configured or if interleaved VRB-to-PRB mapping is not configured by high layers;
  - 1 bit according to Table 7.3.1.2.2-5 otherwise, only applicable to resource allocation type 1, as defined in Subclause 7.3.1.6 of [4, TS 38.211].
- PRB bundling size indicator — 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].
- Rate matching indicator — 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.
- ZP CSI-RS trigger — 0, 1, or 2 bits as defined in Subclause 5,1.4.2 of [6, TS 38.214]. The bitwidth for this field is determined as $[\log2(n_{ZP} +1)]$ bits, where $n_{ZP}$ is the number of aperiodic ZP CSI-RS resource sets configured by higher layer.
For transport block 1:
  - Modulation and coding scheme — 5 bits as defined in Subclause 5.1,3.1 of [6, TS 38.214]
  - New data indicator — 1 bit
  - Redundancy version — 2 bits as defined in Table 7.3.1.1.1-2
For transport block 2 (only present if maxNrofCodeWordsScheduledByDCI equals 2):
  - Modulation and coding scheme — 5 bits as defined in Subclause 5.1.3.1 of [6, TS 38.214]
  - New data indicator — 1 bit
  - Redundancy version — 2 bits as defined in Table 7.3.1.1.1-2
  If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.
- HARQ process number — 4 bits
- Downlink assignment index — number of bits as defined in the following TABLE 6-continued

- 4 bits if more than one serving cell are configured in the DL and the higher layer
  parameter pdsch-HARQ-ACK-Codebook=dynamic, where the 2 MSB bits are
  the counter DAI and the 2 LSB bits are the total DAI;
- 2 bits if only one serving cell is configured in the DL and the higher layer parameter
  pdsch-HARQ-ACK-Codebook=dynamic, where the 2 bits are the counter DAI;
- 0 bits otherwise.
- TPC command for scheduled PUCCH — 2 bits as defined in Subclause 7.2.1 of
  [5, TS 38.213]
- PUCCH resource indicator (PUCCH 자원 지시자) — 3 bits as defined in Subclause
  9.2.3 of [5, TS 38.213]
- PDSCH-to-HARQ_feedback timing indicator — 0, 1, 2, or 3 bits as defined in Subclause
  9.2.3 of [5, TS 38.213]. The bitwidth for this field is determined as $[\log_2(I)]$
  bits, where I is the number of entries in the higher layer parameter dl-DataToUL-ACK.
- Antenna port(s) — 4, 5, or 6 bits as defined by Tables 7.3,1.2.2-1/2/3/4, where the
  number of CDM groups without data of values 1, 2, and 3 refers to CDM groups
  {0}, {0,1}, and {0, 1,2} respectively. The antenna ports {$p_0$, ..., $p_{0-1}$} shall be determined
  according to the ordering of DMRS port(s) given by Tables 7.3.1.2.2-1/2/3/4.
  If a UE is configured with both dmrs-DownlinkForPDSCH-MappingTypeA and dmrs-
  DownlinkForPDSCH-MappingTypeB, the bitwidth of this field equals max{$x_A,x_B$},
  where $x_A$ is the "Antenna ports" bitwidth derived according to dmrs-DownlinkForPDSCH-
  MappingTypeA and $x_B$ is the "Antenna ports" bitwidth derived according to dmrs-
  DownlinkForPDSCH-MappingTypeB. A number of $|x_A - x_B|$ zeros are padded in the
  MSB of this field, if the mapping type of the PDSCH corresponds to the smaller
  value of $x_A$ and $x_B$.
- Transmission configuration indication — 0 bit if higher layer parameter tci-PresentInDCI
  is not enabled; otherwise 3 bits as defined in Subclause 5.1.5 of [6, TS38.214].
  If "Bandwidth part indicator" field indicates a bandwidth part other than the active
  bandwidth part,
  - if the higher layer parameter tci-PresentInDCI is not enabled for the CORESET
    used for the PDCCH carrying the DCI format 1_1.
    - the UE assumes tci-PresentInDCI is not enabled for all CORESETs in the
      indicated bandwidth part;
  - otherwise,
    - the UE assumes tci-PresentInDCI is enabled for all CORESETs in the indicated
      bandwidth part.
- SRS request — 2 bits as defined by Table 7.3.1.1.2-24 for UEs not configured with
  supplementaryUplink in ServingCellConfig in the cell; 3 bits for UEs configured with
  supplementaryUplink in ServingCellConfig in the cell where the first bit is the non-
  SUL/SUL indicator as defined in Table 7.3,1.1.1-1 and the second and third bits are
  defined by Table 7.3.1.1.2-24. This bit field may also indicate the associated CSI-RS
  according to Subclause 6.1.1.2 of [6, TS 38.214].
- CBG transmission information (CBGTI) — 0 bit if higher layer parameter
  codeBlockGroupTransmission for PDSCH is not configured, otherwise, 2, 4, 6, or 8 bits
  as defined in Subclause 5.1.7 of [6, TS38.214], determined by the higher layer parameters
  maxCodeBlockGroupsPerTransportBlock and maxNrofCodeWordsScheduledByDCI
  for the PDSCH.
- CBG flushing out information (CBGFI) — 1 bit if higher layer parameter
  codeBlockGroupFlushIndicator is configured as "TRUE", 0 bit otherwise.
- DMRS sequence initialization — 1 bit.

Hereinafter, a method of allocating a time domain resource for a data channel in a 5G communication system will now be described.

A base station may configure a table for time domain resource allocation information for a downlink data channel (PDSCH) and an uplink data channel (PUSCH) in a UE through higher layer signaling (e.g., RRC signaling). The base station may configure a table of up to maxNrofDL-Allocations=16 entries for the PDSCH, and may configure a table of up to maxNrofUL-Allocations=16 entries for the PUSCH. The time domain resource allocation information may include, for example, a PDCCH-to-PDSCH slot timing (corresponding to a time interval in slots between a time when a PDCCH is received and a time when a PDSCH scheduled by the received PDCCH is transmitted, denoted by K0) or a PDCCH-to-PUSCH slot timing (corresponding to a time interval in slots between a time when a PDCCH is received and a time when a PUSCH scheduled by the received PDCCH is transmitted, denoted by K2), information about the position and length of a start symbol in which a PDSCH or PUSCH is scheduled within a slot, a PDSCH or PUSCH mapping type, and the like. For example, information shown in the following tables may be notified by the base station to the UE.

TABLE 7

| PDSCH-TimeDomainResourceAllocationList information element |
|---|
| PDSCH-TimeDomainResourceAllocationList ::= SEQUENCE (SIZE(1..maxNrofDL-Allocations)) OF PDSCH-TimeDomainResourceAllocation |
| PDSCH-TimeDomainResourceAllocation ::= SEQUENCE { |
|   k0    INTEGER(0..32) |
|   OPTIONAL, -- Need S |
|   (PDCCH-to-PDSCH TIMING, SLOT UNIT) |
|   mappingType    ENUMERATED {typeA typeB}, |
|   (PDSCH MAPPING TYPE) |

TABLE 7-continued

PDSCH-TimeDomainResourceAllocationList information element

| | |
|---|---|
| startSymbolAndLength<br>(START SYMBOL AND LENGTH OF PDSCH)<br>} | INTEGER (0..127) |

TABLE 8

PUSCH-TimeDomainResourceAllocation information element

| | |
|---|---|
| PUSCH-TimeDomainResourceAllocationList ::= | SEQUENCE (SIZE(1 ..maxNrofUL-Allocations)) OF PUSCH-TimeDomainResourceAllocation |
| PUSCH-TimeDomainResourceAllocation ::= | SEQUENCE { |
| k2<br>(PDCCH-to-PUSCH TIMING, SLOT UNIT) | INTEGER(0..32)    OPTIONAL,  -- Need S |
| mappingType<br>(PUSCH MAPPING TYPE) | ENUMERATED {typeA, typeB} |
| startSymbolAndLength<br>(START SYMOLB AND LENGTH OF PUSCH)<br>} | INTEGER (0..127) |

The base station may notify the UE of one of the entries in the table for the time domain resource allocation information through L1 signaling (e.g., DCI) (e.g., may indicate via a 'time domain resource allocation' field in the DCI). The UE may acquire time domain resource allocation information for the PDSCH or PUSCH based on the DCI received from the base station.

Hereinafter, a method of allocating a frequency domain resource for a data channel in a 5G communication system will now be described.

In 5G, two types, that is, resource allocation type 0 and resource allocation type 1, are supported as a method of indicating frequency domain resource allocation information for a downlink data channel (PDSCH) and an uplink data channel (PUSCH).

Resource Allocation Type 0

RB allocation information may be notified from a base station to a UE as a bitmap for a resource block group (RBG). In this case, the RBG may include a set of consecutive virtual RBs (VRBs), and a size P of the RBG may be determined based on a value configured as a higher layer parameter rbg-Size and a BWP size value defined in the following table.

TABLE 9

| | Nominal RBG size P | Nominal RBG size P |
|---|---|---|
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

The total number $N_{RBG}$ of RBGs of a BWP i with a size of $N_{BWP,i}^{size}$ may be defined as follows.
$N_{RBG} = \lceil (N_{BWP,i}^{size} + (N_{BWP,i}^{start} \bmod P))/P \rceil$, where
the size of the first RBG is $RBG_0^{size} = P - N_{BWP,i}^{start} \bmod P$,
the size of last RBG is $RBG_{last}^{size} = (N_{BWP,i}^{start} + N_{BWP,i}^{size}) \bmod P$ if $(N_{BWP,i}^{start} + N_{BWP,i}^{size}) \bmod P > 0$ and P otherwise,
the sire of all other RBGs Is P.

Each bit of the bitmap with the size of $N_{RBG}$ bits may correspond to each RBG. RBGs may be indexed in an order of increasing frequency starting from a lowermost frequency position of the BWP. For $N_{RBG}$ RBGs in the BWP, RBG #0 to RBG #($N_{RBG-1}$) may be mapped from a most significant bit (MSB) to a least significant bit (LSB) of the RBG bitmap. When a specific bit value in the bitmap is 1, the UE may determine that the RBG corresponding to the specific bit value is allocated, and when a specific bit value in the bitmap is 0, the UE may determine that the RBG corresponding to the specific bit value is not allocated.

Resource Allocation Type 1

RB allocation information may be notified from a base station to a UE as information about a start position and a length for consecutively allocated VRBs. In this case, interleaving or non-interleaving may be additionally applied to the consecutively allocated VRBs. A resource allocation field of resource allocation type 1 may include a resource indication value (RIV), and the RIV may include a start point $RB_{start}$ of the VRB and a length $L_{RBs}$ of consecutively allocated RBs. In more detail, the RIV in a BWP with a size of $N_{BWP}^{size}$ may be defined as follows.

if $(L_{RBs}-1) \leq \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size}-L_{RBs}+1) + (N_{BWP}^{size}-1-RB_{start})$ where $L_{RBs} \geq 1$ and shall not exceed $N_{BWP}^{size}-RB_{start}$.

A downlink control channel in the 5G communication system will now be described in detail with reference to the drawings.

Figure 4:
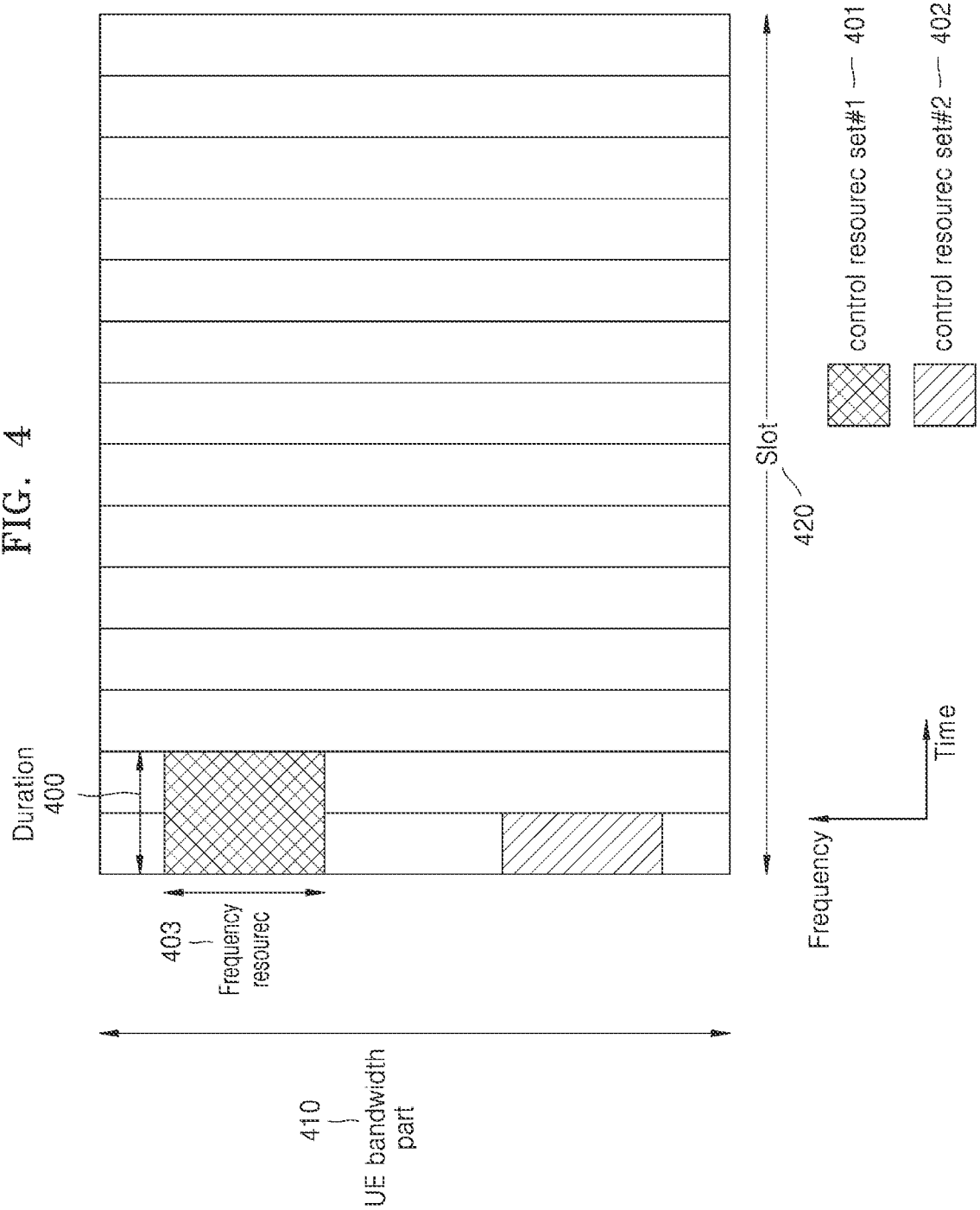
FIG. 4 is a diagram illustrating a control resource set (CORESET) on which a downlink control channel is transmitted in a 5G wireless communication system.

FIG. 4 is a diagram illustrating a control resource set (CORESET) in which a downlink control channel is transmitted in a 5G wireless communication system. In FIG. 4, a UE BWP 410 is configured in a frequency axis, and two control resource sets (a control resource set #1 401 and a control resource set #2 402) are configured in one slot 420 in a time axis. The control resource set #1 401 and the control resource set #2 402 may be configured to a specific frequency resource 403 within the entire UE BWP 410 along the frequency axis. One or more OFDM symbols may be configured along the time axis, and may be defined as a control resource set duration 404. Referring to FIG. 4, the control resource set #1 401 may be configured with the control resource set duration of two symbols, and the control resource set #2 402 may be configured with the control resource set duration of one symbol.

In 5G, a base station may configure each control resource set in a UE through higher layer signaling (e.g., system information, master information block (MIB), or radio resource control (RRC) signaling). When the control resource set is configured for the UE, it means that information such as a control resource set ID, a frequency position of the control resource set, and a symbol duration of the control resource set is provided to the UE. For example, the information provided to configure the control resource set is as follows.

plurality of REGs 503. For example, in FIG. 5, the REG 503 may include 12 REs, and when one CCE 504 includes 6 REGs 503, the one CCE 504 may include 72 REs. When a downlink control resource set is configured, the downlink control resource set may include a plurality of CCEs 504, and a specific downlink control channel may be transmitted after being mapped to one or more CCEs 504 according to an aggregation level (AL) in the control resource set. The CCEs 504 in the control resource set may be distinguished by numbers. In this case, the numbers may be assigned to the CCEs 504 in a logical mapping method.

Figure 5:
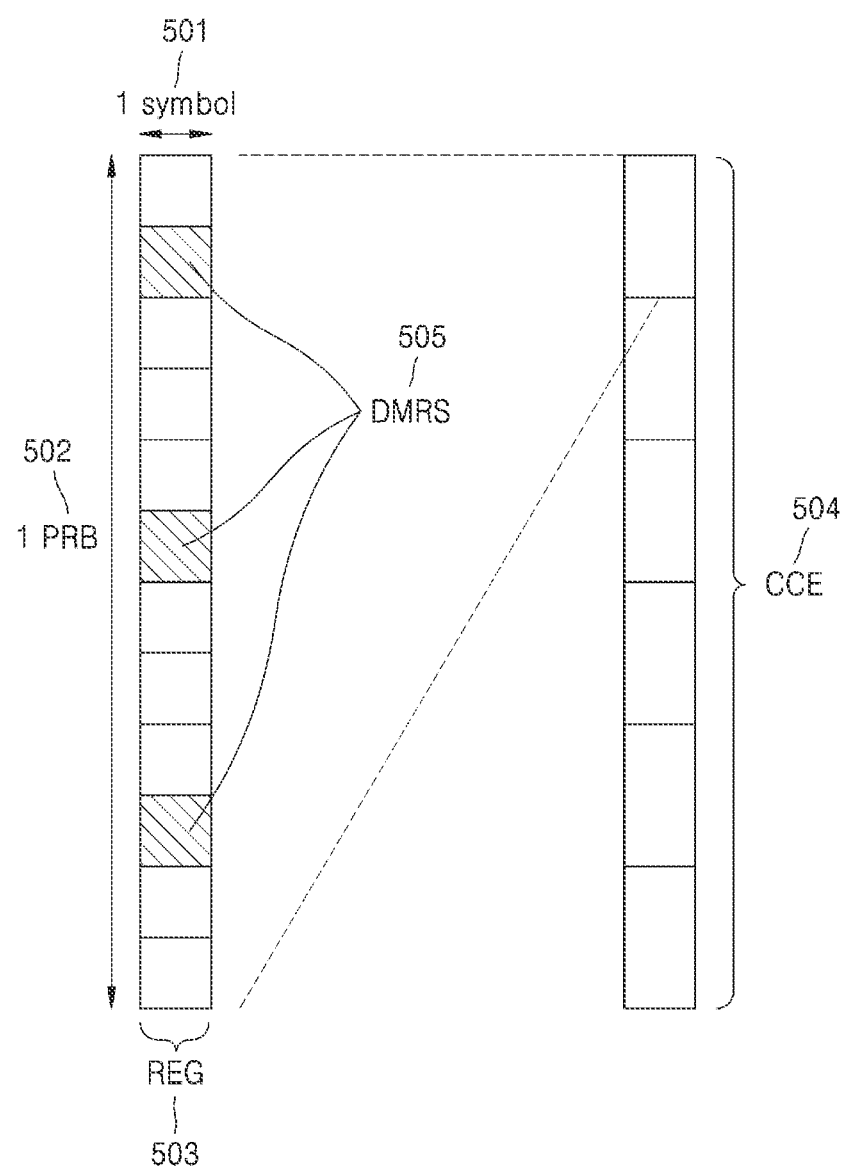
FIG. 5 is a diagram illustrating a basic unit of time and frequency resources constituting a downlink control channel that may be used in 5G.

The basic unit of the downlink control channel shown in FIG. 5, i.e., the REG 503, may include both REs to which DCI is mapped and regions to which a DMRS 505 that is a reference signal for decoding is mapped. As shown in FIG. 5, three DMRSs 505 may be transmitted in one REG 503. The number of CCEs required to transmit a PDCCH may be 1, 2, 4, 8, or 16 according to the aggregation level (AL), and

TABLE 10

```
ControlResourceSet ::=                SEQUENCE{
    -- Corresponds to L1 parameter 'CORESET-ID'
    controlResourceSetId            ControlResourceSetId,
    frequencyDomainResources        BIT STRING (SIZE (45)),
    (frequency domain resource allocation Information)
    duration                        INTEGER (1..maxCoReSetDuration),
    (time domain resource allocation information)
    cce-REG-MappingType             CHOICE {
    (CCE-to-REG mapping type)
        interleaved                 SEQUENCE {
            reg-BundleSize          ENUMERATED {n2, n3, n6},
            precoderGranularity     ENUMERATED    {sameAsREG-bundle,
        allContiguousRBs},
            interleaverSize         ENUMERATED {n2, n3, n6}
            shiftIndex
            INTEGER(0..maxNrofPhysicalResourceBlocks-1)
            OPTIONAL
            (interleaver shift)
        },
        nonInterleaved              NULL
    },
    tCi-StatesPDCCH                 SEQUENCE(SIZE    (1..maxNrofTCI-
        StatesPDCCH)) OF TCI-StateId     OPTIONAL,
    (QCL configuration information)
    tci-PresentInDCI                ENUMERATED {enabled}
                    OPTIONAL,     -- Need S
}
```

In Table 10, tci-StatesPDCCH (simply referred to as transmission configuration indication (TCI) state) configuration information may include information about one or more synchronization signal (SS)/physical broadcast channel (PBCH) block indexes having a quasi-co-located (QCLed) relationship with a demodulation reference signal (DMRS) transmitted in a corresponding control resource set or channel state information reference signal (CSI-RS) indexes.

FIG. 5 is a diagram illustrating a basic unit of time and frequency resources constituting a downlink control channel that may be used in 5G. Referring to FIG. 5, a basic unit of time and frequency resources constituting a control channel may be referred to as a resource element group (REG) 503. The REG 503 may be defined by one OFDM symbol 501 in a time axis and one physical resource block (PRB) 502, i.e., 12 subcarriers, in a frequency axis. A base station may configure a downlink control channel allocation unit by concatenating REGs 503.

As shown in FIG. 5, when a basic unit to which the downlink control channel is allocated in 5G is a control channel element (CCE) 504, one CCE 504 may include a a different number of CCEs may be used to implement link adaptation of the downlink control channel. For example, when AL=L, one downlink control channel may be transmitted through L CCEs. The UE should detect a signal without knowing information about the downlink control channel, and a search space representing a set of CCEs may be defined for blind decoding. The search space may be a set of downlink control channel candidates including CCEs which the UE should attempt to decode at a given aggregation level. Because there are various aggregation levels that make 1, 2, 4, 8, and 16 CCEs into one bundle, the UE may have a plurality of search spaces. A search space set may be defined as a set of search spaces at all configured aggregation levels.

A search space may be classified into a common search space and a UE-specific search space. A certain group of UEs or all UEs may investigate a common search space of a PDCCH in order to receive cell-common control information such as a paging message or dynamic scheduling for system information. For example, the UEs may receive PDSCH scheduling allocation information for SIB transmission including cell service provider information or the like by investigating the common search space of the PDCCH. The common search space may be defined as a set of previously appointed CCEs because the certain group of UEs or all UEs should receive the PDCCH. The UE may receive UE-specific PDSCH or PUSCH scheduling allocation information by investigating a UE-specific search space of a PDCCH. The UE-specific search space may be UE-specifically defined through a function of various system parameters and an identity of the UE.

In 5G, parameters for a search space of a PDCCH may be configured by a base station in a UE through higher layer signaling (e.g., SIB, MIB, or RRC signaling). For example, the base station may configure, in the UE, the number of PDCCH candidates at each aggregation level L, a monitoring period for the search space, a monitoring occasion of a symbol unit within a slot for the search space, a search space type (i.e., a common search space or a UE-specific search space), a combination of an RNTI and a DCI format to be monitored in the search space, and an index of a control resource set for monitoring the search space. For example, the parameters for the search space of the PDCCH may include the following information.

configured to monitor DCI format B scrambled by a Y-RNTI in a UE-specific search space.

According to the configuration information, one or more search space sets may exist in the common search space or the UE-specific search space. For example, a search space set #1 and a search space set #2 may be configured as the common search space, and a search space set #3 and a search space set #4 may be configured as the UE-specific search space.

In the common search space, a combination of a DCI format and an RNTI as follows may be monitored. However, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, a combination of a DCI format and an RNTI as follows may be monitored. However, the disclosure is not limited to the following examples.

TABLE 11

```
SearchSpace ::=                         SEQUENCE {
-- Identity of the search space. SearchSpaceId = 0 identifies the SearchSpace configured via
    PBCH (MIB) or ServingCellConfigCommon.
searchSpaceId                           SearchSpaceId,
controlResourceSetId                    ControlResourceSetId,
monitoringSlotPeriodicityAndOffset      CHOICE {
    sl1                                     NULL,
    sl2                                     INTEGER (0..1),
    sl4                                     INTEGER (0..3),
    sl5                                     INTEGER (0..4),
    sl8                                     INTEGER (0..7),
    sl10                                    INTEGER (0..9),
    sl16                                    INTEGER (0..15),
    sl20                                    INTEGER (0..19)
}
                        OPTIONAL,
duration(monitoring duration)           INTEGER (2..2559)
monitoringSymbolsWithinSlot             BIT STRING (SIZE (14))
                        OPTIONAL,
nrofCandidates                          SEQUENCE{
(number of PDCCH candidates per aggregation level)
    aggregationLevel1                       ENUMERATED {n0, n1, n2, n3, n4, n5, n6, n8},
    aggregationLevel2                       ENUMERATED {n0, n1, n2, n3, n4, n5, n6, n8},
    aggregationLevel4                       ENUMERATED {n0, n1, n2, n3, n4, n5, n6, n8},
    aggregationLevel8                       ENUMERATED {n0, n1, n2, n3, n4, n5, n6, n8},
    aggregationLevel16                      ENUMERATED {n0, n1, n2, n3, n4, n5, n6,
    n8}
},
searchSpaceType                         CHOICE {
-- Configures this search space as common search space (CSS) and DCI formats to
monitor.
    common                                  SEQUENCE {
    }
    ue-Specific                             SEQUENCE {
    -- Indicates whether the UE monitors in this USS for DCI formats 0-0 and 1-0 or for
    formats 0-1 and 1-1.
        formats                                 ENUMERATED     {formats0-0-And-1-0,
        formats0-1-And-1-1},
        ...
    }
```

A base station may configure one or more search space sets in a UE according to configuration information. According to some embodiments, the base station may configure a search space set 1 and a search space set 2 in the UE. In the search space set 1, the UE may be configured to monitor DCI format A scrambled by an X-RNTI in a common search space, and in the search space set 2, the UE may be DCI format 0_0/1_0 with CRC scrambled by C-RNTI, CS-RNTI, TC-RNTI DCI format 1_0/1_1 with CRC scrambled by C-RNTI, CS-RNTI, TC-RNTI The specified RNTIs may follow the following definitions and uses.

C-RNTI (Cell RNTI): used for UE-specific PDSCH scheduling

TC-RNTI (Temporary Cell RNTI): used for UE-specific PDSCH scheduling

CS-RNTI (Configured Scheduling RNTI): used for semi-statically configured UE-specific PDSCH scheduling RA-RNTI (Random Access RNTI): used for PDSCH scheduling in a random access stage P-RNTI (Paging RNTI): used for PDSCH scheduling for transmitting paging SI-RNTI (System Information RNTI): used for PDSCH scheduling for transmitting system information INT-RNTI (Interruption RNTI): used for notifying whether a PDSCH is punctured TPC-PUSCH-RNTI (Transmit Power Control for PUSCH RNTI): used for indicating a power control command for a PUSCH TPC-PUCCH-RNTI (Transmit Power Control for PUCCH RNTI): used for indicating a power control command for a PUCCH TPC-SRS-RNTI (Transmit Power Control for SRS RNTI): used for indicating a power control command for an SRS The above DCI formats may follow the following definitions.

TABLE 12

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space at an aggregation level L in a control resource set p and a search space set s may be expressed as in the following equation.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad \text{[Equation 1]}$$

L: aggregation level $n_{CI}$: carrier index $N_{CCE,p}$: the total number of CCEs existing in the control resource set p $n_{s,f}^\mu$: slot index $M_{p,s,max}^{(L)}$: the number of PDCCH candidates for aggregation level L $m_{s,n_{CI}} = 0, \ldots, M_{p,s,max}^{(L)} - 1$: PDCCH candidate indexes for aggregation level L i=0, . . . , L−1

$$Y_{p,n_{s,f}^\mu} = \left( A_p \cdot Y_{p,n_{s,f}^\mu - 1} \right) \mod D,$$

$Y_{p,-1} = n_{RNTI} \neq 0$, $A_0 = 39827$, $A_1 = 39829$, $A_2 = 39839$, $D = 65537$ $n_{RNTI}$: UE identifier $Y\_(p, n_{s,f}^\mu)$ may correspond to 0 in a common search space.

In a UE-specific search space, $Y\_(p, n_{s,f}^\mu)$ may correspond to a value that varies according to an identity of a UE (a C-RNTI or an ID configured by a base station for the UE) and a time index.

As a plurality of search space sets may be configured with different parameters (e.g., the parameters in Table 10) in 5G, a set of search space sets monitored by a UE may be changed at every point of time. For example, when a search space set #1 is configured with X-slot periodicity and a search space set #2 is configured with Y-slot periodicity, where X and Y are different, the UE may monitor both the search space set #1 and the search space set #2 in a particular slot, and may monitor one of the search space set #1 and the search space set #2 in another particular slot.

When a plurality of search space sets are configured for the UE, the following conditions may be taken into account in a method for determining a search space set to be monitored by the UE.

[Condition 1: Restriction on the Maximum Number of PDCCH Candidates]

The number of PDCCH candidates to be monitored per slot does not exceed $M^\mu$. $M^\mu$ may be defined as the maximum number of PDCCH candidates per slot in a cell configured with a subcarrier spacing of $15 \cdot 2^\mu$ kHz kHz, as in the following table.

TABLE 13

| $\mu$ | Maximum number of PDCCH candidates per slot and per serving cell ($M^\mu$) |
| --- | --- |
| 0 | 44 |
| 1 | 36 |
| 2 | 22 |
| 3 | 20 |

[Condition 2: Restriction on the Maximum Number of CCEs]

The number of CCEs constituting the entire search space (the entire search space herein refers to an entire CCE set corresponding to a union region of a plurality of search space sets) per slot does not exceed $C^\mu$. $C^\mu$ may be defined as the maximum number of CCEs per slot in a cell configured with a subcarrier spacing of $15 \cdot 2^\mu$ kHz, as in the following table.

TABLE 14

| $\mu$ | Maximum number of CCEs per slot and per serving cell ($C^\mu$) |
| --- | --- |
| 0 | 56 |
| 1 | 56 |
| 2 | 48 |
| 3 | 32 |

For convenience of explanation, a situation where both Conditions 1 and 2 are satisfied at a particular point of time is defined to be "Condition A". Accordingly, when Condition A is not satisfied, it may mean that at least one of Conditions 1 and 2 is not satisfied.

Depending on configurations of search space sets of a base station, Condition A may not be satisfied at a particular point of time. When Condition A is not satisfied at a particular point of time, the UE may select and monitor some of the search space sets, which are configured to satisfy Condition A at the particular point of time, and the base station may transmit a PDCCH in the selected search space sets.

Only some search spaces may be selected from among all configured search space sets according to the following methods.

In case that Condition A for a PDCCH is not satisfied at a particular point of time (slot), a UE (or the base station) may select a search space set, among search space sets existing at the corresponding point of time, configured as a common search space, in preference to a search space set configured as a UE-specific search space.

In case that all search space sets configured as common search spaces are selected (that is, Condition A is satisfied even after all the search spaces configured as common search spaces are selected), the UE (or the base station) may select search space sets configured as UE-specific search spaces. In case that the number of the search space sets configured as UE-specific search spaces is plural, a search space set having a lower search space set index may have higher priority. In consideration of priority, the UE (or the base station) may select UE-specific search space sets within a range of satisfying Condition A.

In 5G, a control resource set may include $N_{RB}^{CORSET}$ RB in a frequency domain, and may include $N_{symb}^{CORESET} \in (1, 2, 3)$ symbols in a time axis. One CCE may include six REGs, and an REG may be defined as one RB during one OFDM symbol. REGs in one control resource set may be indexed in a time-first order, by starting to provide an REG index of 0 for a lowest RB in an initial OFDM symbol of the control resource set.

In 5G, an interleaving method and a non-interleaving method are supported as PDCCH transmission methods. A base station may configure whether to perform interleaving transmission or non-interleaving transmission for each control resource set in a UE through higher layer signaling. Interleaving may be performed in units of REG bundles. The term 'REG bundle' may be defined as one or more REG sets. The UE may determine a CCE-to-REG mapping method in the control resource set by using the following method based on whether to perform interleaving or non-interleaving transmission configured by the base station.

resources B overlap each other. For example, when symbol sequences A include {symbol #1, symbol #2, symbol #3, symbol 4}, resources A are {resource #1, resource #2, resource #3, resource #4}, and resources B are {resource #3, resource #5}, the base station may sequentially map the symbol sequences A to {resource #1, resource #2, resource #4} which are resources other than {resource #3} corresponding to a resource C and may transmit the same. As a result, the base station may respectively map the symbol sequences {symbol #1, symbol #2, symbol #3} to {resource #1, resource #2, resource #4} and may transmit the same.

The UE may determine the resources A and the resources B from scheduling information for the symbol sequences A, and thus, may determine the resource C that is a region where the resources A and the resources B overlap each other. The UE may receive the symbol sequences A by assuming that the symbol sequences A are mapped to resources other than the resource C from among all of the resources A and are transmitted. For example, when symbol sequences A include {symbol #1, symbol #2, symbol #3, symbol 4}, resources A are {resource #1, resource #2, resource #3, resource #4}, and resources B are {resource #3, resource #5}, the UE may receive the symbol sequences A by assuming that the symbol sequences A are sequentially mapped to {resource #1, resource #2, resource #4} which are resources other than {resource #3} corresponding to a resource C from among the resources A. As a result, the UE may assume that the symbol sequences {symbol #1, symbol #2, symbol #3} are respectively mapped to {resource #1, resource #2, resource #4} and are transmitted, and may perform a subsequent series of reception operations.

Puncturing Operation

From among all resources A in which symbol sequences A are to be transmitted to a UE, when there exists a resource C corresponding to a region where the resources A and resources B overlap each other, a base station may map the

TABLE 15

The CCE-to-REG mapping for a control-resource set can be interleaved or non-interleaved and is described by REG bundles:
- REG bundle i is defined as REGs {iL, iL +1, . . . , iL + L − 1} where L is the REG bundle size, i = 0,1 , . . . , $N_{REG}^{CORESET}$/L − 1, AND $N_{REG}^{CORESET}$ = $N_{RB}^{CORESET} N_{symb}^{CORESET}$ is the number of REGs in the CORESET
- CCE j consists of REG bundles [ƒ(6j/L), ƒ(6j/L +1), . . . , ƒ(6j/L + 6/L − 1)] where ƒ(.) is an interleaver
For non-interleaved CCE-to-REG mapping, L = 6 and ƒ(x) = x.
For interleaved CCE-to-REG mapping, L ∈ {2,6} for $N_{symb}^{CORESET}$ = 1 and l ∈ {$N_{symb}^{CORESET}$, 6} for $N_{symb}^{CORESET}$ ∈ {2,3}.
The interleaver is defined by $$f(x) = (rC + c + n_{shift}) \mod (N_{REG}^{CORESET}/L)$$
$$x = cR + r$$
$$r = 0, 1, \ldots, R - 1$$
$$c = 0, 1, \ldots, C - 1$$
$$C = N_{REG}^{CORESET}/(LR)$$

where R ∈ {2,3,6}.

A rate matching operation and a puncturing operation will now be described in detail.

When time and frequency resources A in which symbol sequences A are to be transmitted overlap time and frequency resources B, a rate matching operation or a puncturing operation may be considered as an operation of transmitting and receiving a channel A considering resources C where the resources A and the resources B overlap. A detailed operation may be as follows.

Rate Matching Operation

From among all resources A in which symbol sequences A are to be transmitted to a UE, a base station may map and transmit only resources other than a resource C corresponding to a region where the resources A and symbol sequences A to all of the resources A, but may not perform transmission for a resource corresponding to the resource C and may perform transmission for resources other than the resource C from among all of the resources A. For example, when symbol sequences A include {symbol #1, symbol #2, symbol #3, symbol 4}, resources A are {resource #1, resource #2, resource #3, resource #4}, and resources B are {resource #3, resource #5}, the base station may respectively map the symbol sequences A {symbol #1, symbol #2, symbol #3, symbol #4} to the resources A {resource #1, resource #2, resource #3, resource #4}, and may transmit only symbol sequences {symbol #1, symbol #2, symbol #4} corresponding to {resource #1, resource #2, resource #4} which are resources other than {resource #3} corresponding to a resource C from among all of the resources A and may not transmit {symbol #3} mapped to {resource #3} corresponding to the resource C. As a result, the base station may respectively map the symbol sequences {symbol #1, symbol #2, symbol #4} to {resource #1, resource #2, resource #4} and may transmit the same.

The UE may determine the resources A and the resources B from scheduling information for the symbol sequences A, and thus, may determine the resource C that is a region where the resources A and the resources B overlap each other. The UE may receive the symbol sequences A by assuming that the symbol sequences A are mapped to all of the resources A but symbols are transmitted only in resources other than the resource C. For example, when symbol sequences A include {symbol #1, symbol #2, symbol #3, symbol 4}, resources A are {resource #1, resource #2, resource #3, resource #4}, and resources B are {resource #3, resource #5}, the UE may assume that the symbol sequences A {symbol #1, symbol #2, symbol #3, symbol 4} are respectively mapped to the resources A {resource #1, resource #2, resource #3, resource #4} but {symbol #3} mapped to {resource #3} corresponding to a resource C is not transmitted, and may receive symbol sequences by assuming that symbol sequences {symbol #1, symbol #2, symbol #4} corresponding to {resource #1, resource #2, resource #4} which are resources other than {resource #3} corresponding to the resource C from among the resources A are mapped and transmitted. As a result, the UE may assume that the symbol sequences {symbol #1, symbol #2, symbol #4 are respectively mapped to {resource #1, resource #2, resource #4} and are transmitted, and may perform a subsequent series of subsequent reception operations.

A method of configuring a rate matching resource for the rate matching of a 5G communication system will now be described. Rate matching means that the size of a signal is controlled by considering the amount of resources capable of transmitting the signal. For example, the rate matching of a data channel means that the amount of data is adjusted without mapping and transmitting the data channel with respect to a specific time and frequency resource region.

Figure 6:
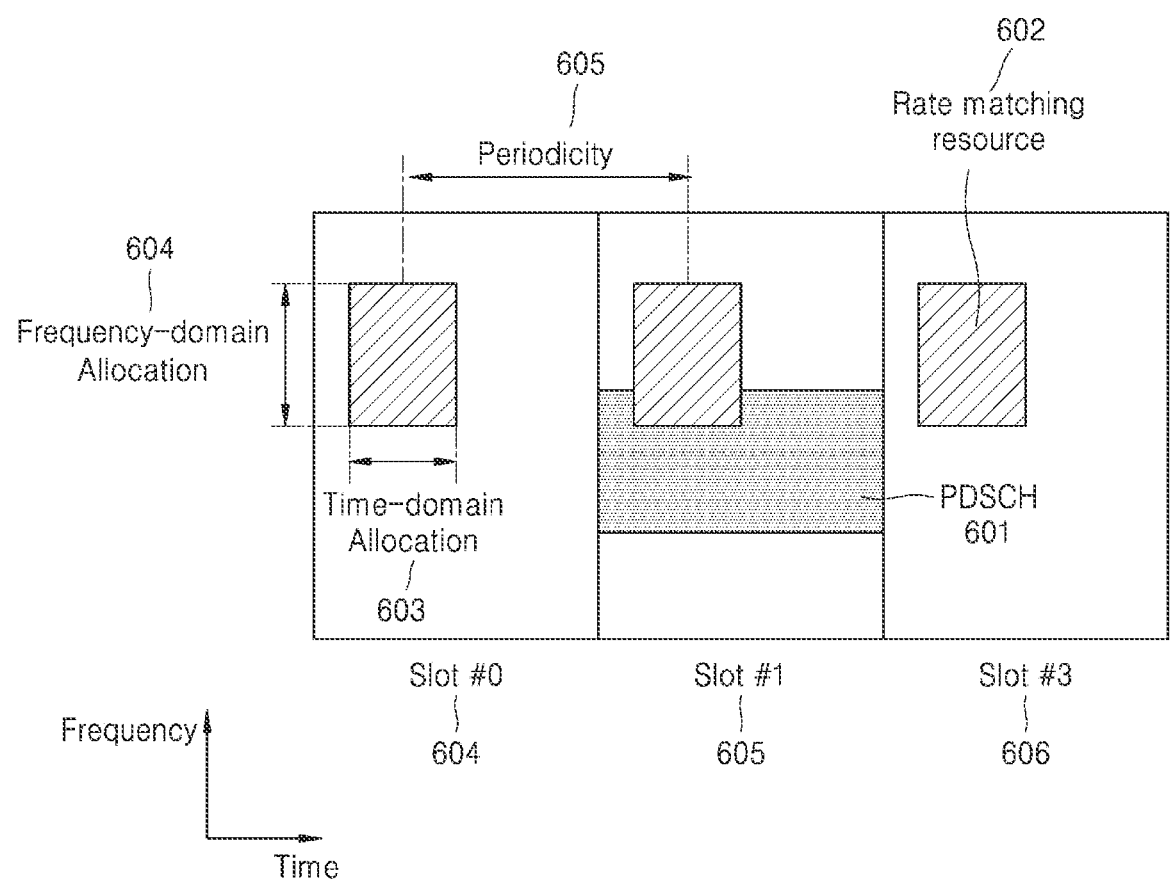
FIG. 6 is a diagram for describing a method by which a base station and a user equipment (UE) transmit and receive data by considering a downlink data channel and a rate matching resource.

FIG. 6 is a diagram for describing a method by which a base station and a UE transmit and receive data by considering a downlink data channel and a rate matching resource.

FIG. 6 shows a downlink data channel (PDSCH) 601 and a rate matching resource 602. A base station may configure one or multiple rate matching resources 602 in a UE through higher layer signaling (e.g., RRC signaling) Configuration information of the rate matching resources 602 may include time domain resource allocation information 603, frequency domain resource allocation information 604, and periodicity information 605 Hereinafter, a bitmap corresponding to the frequency domain resource allocation information 604 is referred to as a "first bitmap", a bitmap corresponding to the time domain resource allocation information 603 is referred to as a "second bitmap", and a bitmap corresponding to the periodicity information 605 is referred to as a "third bitmap". When some or all of time and frequency resources of the scheduled data channel 601 overlap the configured rate matching resources 602, the base station may rate match the data channel 601 in some of the rate matching resources 602 and may transmit the same, and the UE may perform reception and decoding after assuming that the data channel 601 is rate matched in some of the rate matching resources 602.

The base station may dynamically notify the UE whether the data channel will be rate matched in some of the configured rate matching resources through DCI through an additional configuration (corresponding to a "rate matching indicator" in a DCI format). Specifically, the base station may select some of the configured rate matching resources, may group the selected resources into rate matching resource groups, and may indicate whether the data channel is rate matched with each rate matching resource group through DCI using a bitmap method with respect to the UE. For example, when four rate matching resources RMR #1, RMR #2, RMR #3 and RMR #4 are configured, the base station may configure RMG #1={RMR #1, RMR #2} and RMG #2={RMR #3, RMR #4} as rate matching groups, and may indicate whether rate matching in each of RMG #1 and RMG #2 is performed using 2 bits of a DCI field with respect to the UE in the form of a bitmap. For example, the base station may indicate "1" when rate matching needs to be performed, and may indicate "0" when rate matching do not need to be performed.

5G supports "RB symbol level" and "RE level" granularity as a method of configuring a rate matching resource in a UE. In more detail, the following configuration methods may be performed.

RB Symbol Level

A UE may be configured with up to four RateMatchPatterns for each BWP through higher layer signaling, and one RateMatchPattern may include the following content.

- As reserved resources in a BWP, resources in which time and frequency resource regions of the reserved resources are configured in a combination of an RB level bitmap and a symbol level bitmap in a frequency axis may be included. The reserved resources may span one or two slots. A time domain pattern (periodicityAndPattern) in which time and frequency domains including each RB level and symbol level bitmap pair are repeated may be additionally configured.
- A time and frequency domain resource region configured by a control resource set in a BWP and a resource region corresponding to a time domain pattern configured by a search space configuration in which the resource region is repeated may be included.

RE Level

A UE may be configured with the following content through higher layer signaling.

- As configuration information (lte-CRS-ToMatchAround) for REs corresponding to an LTE cell-specific reference signal or common reference signal (CRS) pattern, the number of LTE CRS ports (nrofCRS-Ports) and LTE-CRS-vshift(s) (v-shift), position information (carrier-FregDL) from a reference frequency point (e.g., a reference point A) to an LTE carrier center subcarrier, LTE carrier bandwidth information (carrierBandwidthDL, and multicast-broadcast single-frequency network (MBSFN) subframe configuration information (mbsfn-SubframConfigList) may be included. The UE may determine a position of a CRS in an NR slot corresponding to an LTE subframe based on the above information.
- One or more zero power (ZP) CSI-RS resource set configuration information in a BWP may be included.

Hereinafter, embodiments of the disclosure will be described in detail with reference to the accompanying drawings. While embodiments of the disclosure are described by using a 5G system as an example, the embodiments of the disclosure may also be applied to other communication systems having a similar technical background or channel form. For example, LTE or LTE-A mobile communication and mobile communication technology developed after 5G may be included. Also, the embodiments of the disclosure may be applied to other communication systems through partial modifications without departing from the scope of the disclosure by the judgment of one of ordinary skill in the art.

Also, in the following description of the disclosure, well-known functions or constructions are not described in detail in order to avoid unnecessarily obscuring the gist of the disclosure. The terms used herein are those defined in consideration of functions in the disclosure, and may vary according to the intention of users or operators, precedents, etc. Hence, the terms used herein have to be defined based on the meaning of the terms together with the descriptions throughout the specification.

In the following description of the disclosure, higher layer signaling may be signaling corresponding to at least one or a combination of one or more of the following signaling.

MIB (Master Information Block)
SIB (System Information Block) or SIB X (X=1, 2, ... )
RRC (Radio Resource Control)
MAC (Medium Access Control) CE (Control Element)

In addition, L1 signaling may be signaling corresponding to at least one or a combination of one or more of the following physical layer channels or signaling methods using signaling.

PDCCH (Physical Downlink Control Channel)
DCI (Downlink Control Information)
UE-specific DCI
Group common DCI
Common DCI
Scheduling DCI (for example, DCI used for the purpose of scheduling downlink or uplink data)
Non-scheduling DCI (for example, DCI that is not for the purpose of scheduling downlink or uplink data)
PUCCH (Physical Uplink Control Channel)
UCI (Uplink Control Information)

First Embodiment

In 5G, an NR base station may configure a rate matching resource in an NR UE. As a resource which may be configured as a rate matching resource by the NR base station, for example, a 4G LTE CRS pattern may be included. This may be used to protect a CRS of 4G LTE, when 5G NR and 4G LTE operate by sharing a spectrum in the same frequency band. That is, transmission and reception may not be performed in a resource region corresponding to an LTE CRS in an NR carrier, so that the LTE CRS is protected without being interfered with transmission and reception of NR. Accordingly, the NR base station may configure the LTE CRS pattern as a part of a rate matching resource in the NR UE, and the NR UE may assume that transmission and reception from NR do not occur in a resource region corresponding to the LTE CRS pattern.

In an embodiment of the disclosure, a base station may configure a rate matching resource in a UE, and when a transmission resource of a data channel to be transmitted by the base station overlaps the rate matching resource, the base station may rate match the data channel in an overlapping region and may transmit the same to the UE. The UE may receive the rate matching resource from the base station, and may determine the overlapping region where the transmission resource of the data channel and the rate matching resource overlap from scheduling information of the data channel received from the base station. The UE may assume that the data channel is rate matched in the overlapping region, and may receive the data channel.

In an embodiment of the disclosure, a base station may configure a rate matching resource in a UE, and the rate matching resource may overlap a resource for transmitting a control channel. When one or more REs to which one PDCCH candidate group constituting a certain search space is mapped overlap REs corresponding to the rate matching resource, the base station may not transmit a PDCCH to the UE by using the PDCCH candidate group and may transmit a PDCCH by using another PDCCH candidate group in the certain search space. When one or more REs to which one PDCCH candidate group constituting a certain search space is mapped overlap REs corresponding to the rate matching resource, the UE may not expect a PDCCH to be transmitted by using the PDCCH candidate group, and thus, the UE may monitor other PDCCH candidate groups in the certain search space without monitoring the PDCCH candidate group.

Figure 7:
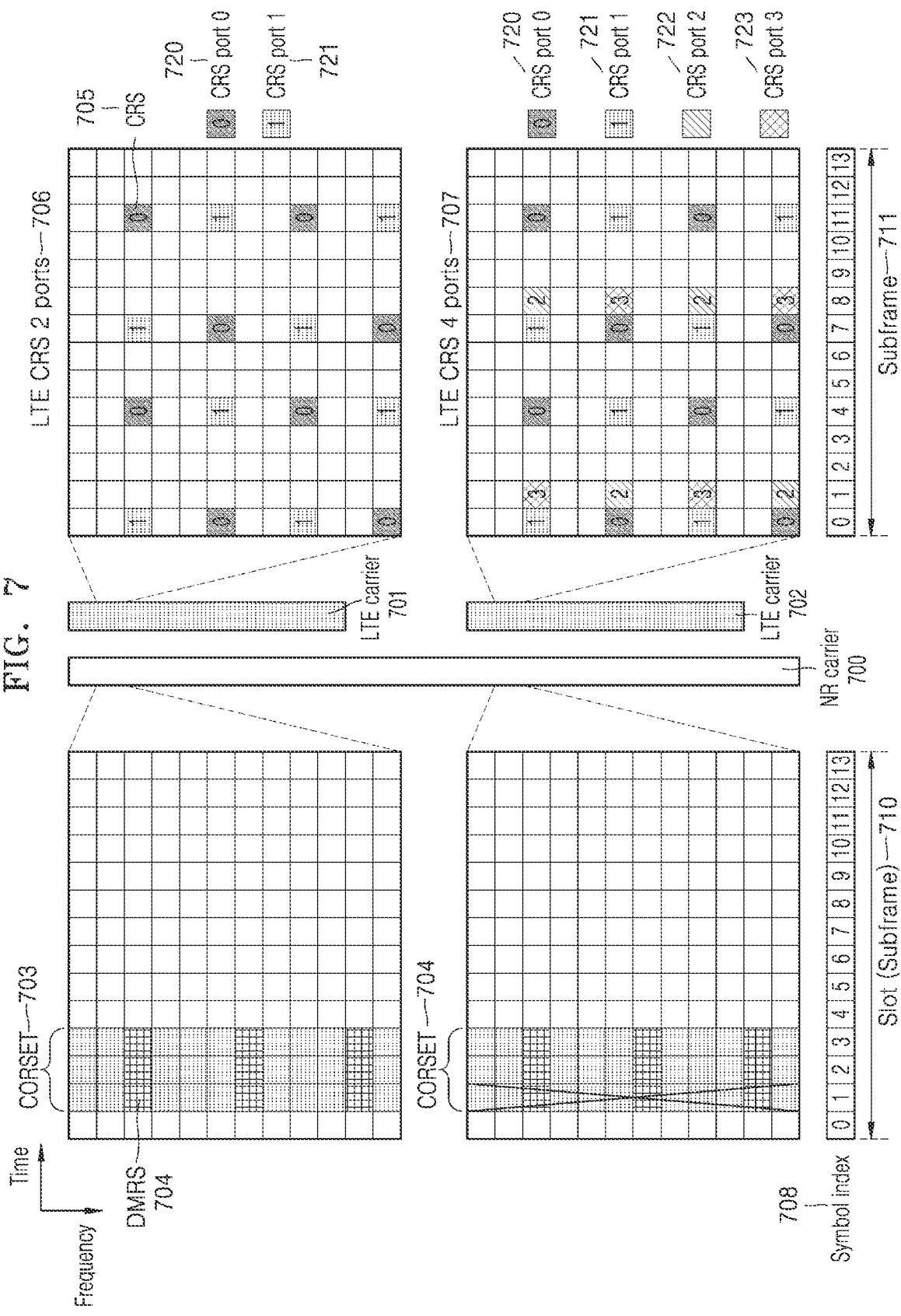
FIG. 7 is a diagram illustrating a situation where LTE and NR share a spectrum.

FIG. 7 is a diagram illustrating a situation where LTE and NR share a spectrum.

One NR carrier may coexist while sharing a spectrum with one or more LTE carriers. To protect an LTE CRS, an NR base station may configure information of LTE CRS patterns of the one or more LTE carriers in an NR UE. The following information may be included to configure the LTE CRS patterns.

Number of LTE CRS ports (nrofCRS-Ports)
LTE-CRS-vshift(s) (v-shift): parameter for determining RE position of LTE CRS
Position of center subcarrier of LTE carrier (carrier-FreqDL)
LTE carrier bandwidth (carrierBandwidthDL)
MBSFN subframe configuration information (mbsfn-SubframConfigList)

The UE may determine a position of a CRS in an NR slot corresponding to an LTE subframe based on the above information.

FIG. 7 illustrates an example where one NR carrier 700 coexists with two LTE carriers 701 and 702. An NR base station may notify an NR UE of configuration information of a CRS pattern for the LTE carrier 701 and a CRS pattern for the LTE carrier 702 through higher layer signaling. A UE may control an operation of transmitting and receiving a data channel and a control channel based on received LTE CRS pattern information. In a method by which the NR base station and the NR UE transmit and receive a control channel, when REs corresponding to a certain PDCCH candidate group overlap REs of an LTE CRS, the PDCCH candidate group may not be used for PDCCH transmission. That is, the NR base station may not perform a PDCCH by using the PDCCH candidate group overlapping the REs corresponding to the LTE CRS, and the NR UE may not monitor the PDCCH candidate group overlapping the REs corresponding to the LTE CRS. In this case, because the LTE CRS may always be periodically and repeatedly transmitted at a fixed symbol position within an entire bandwidth corresponding to the LTE carrier, in some cases, most of NR PDCCH candidates may overlap the LTE CRS and thus may not be used for transmission, and thus, PDCCH transmission and reception in NR may not be smoothly performed. Accordingly, it may be preferable that the NR base station configures a control resource set and a search space of NR by avoiding a symbol in which the LTE CRS is transmitted.

For example, considering the LTE carrier 701, the LTE CRS may be configured to X ports or less (e.g., X=2), for example, 2 ports 706, and thus, the LTE CRS may be transmitted on every 0, 4, 7, and $11^{th}$ symbols in a subframe 711. In this regard, the NR base station may configure a control resource set and a search space in a region where an NR carrier and an LTE carrier overlap each other, by avoiding symbols on which the LTE CRS may be transmitted. For example, the NR base station may configure a control resource set 703 having a length of 3 symbols to be located on first, second, and third symbols in a slot 710. Accordingly, the NR base station and the UE may transmit and receive a PDCCH without being affected by the LTE CRS in the first, second, and third symbols in the slot 710.

In another example, considering the LTE carrier 702, the LTE CRS may be configured to X ports or more (e.g., X=3), for example, 4 ports 707, and thus, the LTE CRS may be transmitted on every 0, 1, 4, 7, 8, and $11^{th}$ symbols in the subframe 711. In this regard, the NR base station may configure a control resource set and a search space in a region where an NR carrier and an LTE carrier overlap each other, by avoiding symbols in which the LTE CRS may be transmitted. Unlike in the LTE carrier 701, it may be impossible to configure a control resource set having a length of three symbols without overlapping the LTE CRS. For example, when the NR base station configures a control resource set 704 having a length of 3 symbols to be located on first, second, and third symbols in the slot 710, a first symbol transmitted on the first symbol from among resources of the control resource set may overlap the LTE CRS and thus may not be used. Accordingly, all PDCCH candidates including the first symbol of the control resource set 704 may not be used for PDCCH transmission. Accordingly, when the LTE CRS is X ports or more, the NR base station has no choice but to configure a control resource set having a length of two symbols. In this case, the coverage or reception quality of an NR PDCCH may be degraded, and thus, transmission and reception of the NR PDCCH may not be effectively performed.

Hereinafter, various embodiments of effectively transmitting a PDCCH of NR in an environment where LTE and NR share a spectrum will be provided.

$1\text{-}1^{st}$ Embodiment

In $1\text{-}1^{st}$ Embodiment of the disclosure, a base station and a UE may differently control an operation of transmitting and receiving a PDCCH according to the number of LTE CRS ports.

Figure 8:
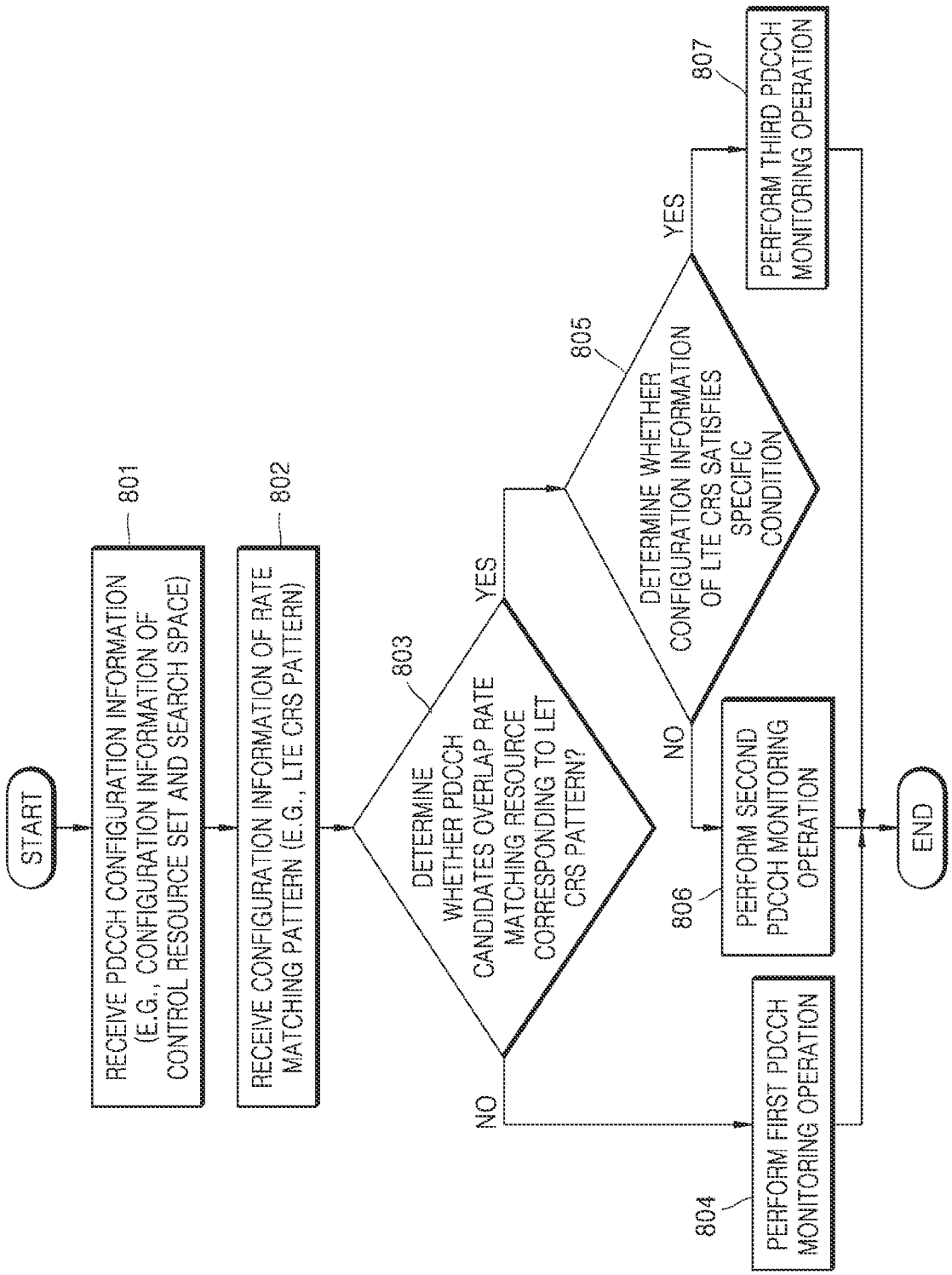
FIG. 8 is a diagram illustrating a UE operation, according to 1-$1^{st}$ Embodiment of the disclosure.

FIG. 8 is a diagram illustrating a UE operation, according to $1\text{-}1^{st}$ Embodiment of the disclosure.

In operation 801, a UE may receive PDCCH configuration information from a base station. The PDCCH configuration information may include configuration information of a control resource set and a search space as described above. In operation 802, the UE may receive configuration information of a rate matching pattern from the base station. The configuration information of the rate matching pattern may include configuration information of an LTS CRS pattern as described above. In operation 803, the UE may determine whether one or more REs to which a PDCCH candidate group in the search space is mapped overlap REs corresponding to the LTE CRS pattern based on the configuration information of the base station.

When it is determined in operation 803 that the REs do not overlap, the UE may perform a "first PDCCH monitoring operation" in operation 804. The "first PDCCH monitoring operation" may include an operation of monitoring the PDCCH candidate group.

When it is determined in operation 803 that the REs overlap, the UE may determine whether the configuration information of the LTE CRS pattern satisfies a specific condition A in operation 805. The specific condition may be a condition corresponding to at least one or a combination of one or more of the following conditions.

[Condition 1]
A case where the number of LTE CRS ports (nrofCRS-Ports) is configured to be greater than X. X may be a value received from the base station, a value reported by the UE as capability to the base station, or a pre-defined fixed value (e.g., X=2).

When it is determined in operation 805 that the specific condition A is not satisfied, the UE may perform a "second PDCCH monitoring operation" in operation 806. The "second PDCCH monitoring operation" may include an operation of not monitoring the PDCCH candidate group or an operation of not expecting to perform monitoring. When it is determined in operation 805 that the configuration information of the LTE CRS pattern satisfies the specific condition A, the UE may perform a "third PDCCH monitoring operation" in operation 807. The "third PDCCH monitoring operation" may include an operation corresponding to at least one or a combination of one or more of the following operations.

[Operation 1]
The UE may perform monitoring by assuming that REs overlapping the LTE CRS from among REs to which the PDCCH candidate group is mapped are rate matched.

[Operation 2]
The UE may perform monitoring by assuming that REs overlapping the LTE CRS from among REs to which the PDCCH candidate group is mapped are punctured.

[Operation 3]
The UE may perform monitoring by assuming that only REs corresponding to the number of ports greater than X from among REs corresponding to the LTE CRS from among REs to which the PDCCH candidate group is mapped are punctured or rate matched.

[Operation 4]
The UE may perform monitoring by assuming that only REs corresponding to the number of ports greater than X from among REs corresponding to the LTE CRS from among REs to which the PDCCH candidate group is mapped are punctured or rate matched. Also, the UE may not expect that the REs to which the PDCCH candidate group is mapped overlap REs corresponding to the number of ports less than X. When the UE receives a PDCCH related configuration and a rate matching resource configuration in which there exists a PDCCH candidate group overlapping the REs corresponding to the number of ports less than X, the UE may determine the configuration as an error.

[Operation 5]
The UE may perform monitoring by assuming that only REs corresponding to the number of ports greater than X from among REs corresponding to the LTE CRS, from among REs to which the PDCCH candidate group is mapped are punctured or rate matched. Also, when the REs to which the PDCCH candidate group is mapped overlap REs corresponding to the number of ports less than X, the UE may not monitor the PDCCH candidate group.

According to $1\text{-}1^{st}$ Embodiment of the disclosure, because the base station and the UE may still use a PDCCH candidate group overlapping a rate matching resource (e.g., REs corresponding to an LTE CRS) in transmission and reception according to a specific condition without dropping the PDCCH candidate group, PDCCH transmission and reception between the base station and the UE may be more smoothly performed.

$1\text{-}2^{st}$ Embodiment

In $1\text{-}2^{nd}$ Embodiment of the disclosure, when REs to a PDCCH DMRS may be mapped and transmitted overlap REs configured as a rate matching resource (the rate matching resource may include a resource corresponding to an LTE CRS pattern), a transmission operation of a base station and a reception operation of a UE for the PDCCH DMRS may be differently controlled.

In some embodiments of the disclosure, the UE may not expect that the REs to which the PDCCH DMRS may be mapped and transmitted overlap the REs configured as the rate matching resource. For example, the rate matching resource may include a resource corresponding to the LTE CRS pattern.

In some embodiments of the disclosure, when the REs to which the PDCCH DMRS may be mapped and transmitted overlap the REs configured as the rate matching resource, the UE may monitor a PDCCH by assuming that the PDCCH DMRS is punctured. For example, the rate matching resource may include a resource corresponding to the LTE CRS pattern.

In some embodiments of the disclosure, when the REs to which the PDCCH DMRS may be mapped and transmitted overlap the REs configured as the rate matching resource, whether the PDCCH DMRS is punctured may be determined based on a configuration of the base station. That is, the base station may configure whether the PDCCH DMRS REs overlapping the REs configured as the rate matching resource are punctured or are not punctured (mapped and transmitted as it is) in the UE through higher layer signaling. When the REs to which the PDCCH DMRS may be mapped and transmitted overlap the REs configured as the rate matching resource based on configuration information of the base station, the UE may monitor the PDCCH by assuming that the PDCCH DMRS is punctured or may monitor the PDCCH by assuming that the PDCCH DMRS is not punctured (i.e., assuming that the PDCCH DMRS is mapped and transmitted as it is).

The PDCCH DMRS that is punctured or not punctured may be transmitted based on the configuration of the base station. The UE may monitor the PDCCH by assuming that the PDCCH DMRS is punctured or is not punctured based on the configuration of the base station as to whether the PDCCH DMRS is punctured. For example, the rate matching resource may include a resource corresponding to the LTE CRS pattern.

In some embodiments of the disclosure, when the REs to which the PDCCH DMRS may be mapped and transmitted overlap the REs configured as the rate matching resource, the UE may monitor the PDCCH by assuming that a position of the PDCCH DMRS is changed. For example, when (time index, frequency index) of an RE to which the PDCCH DMRS is mapped is (i, j) and the RE overlaps the rate matching resource, a position of the RE to which the PDCCH DMRS is mapped may be changed, and the changed position may be determined by using a method corresponding to at least one or a combination of one or more of the following methods.

[Method 1] A frequency index of the PDCCH DMRS may be changed. For example, a position of the RE to which the PDCCH DMRS is mapped may be determined to be (i, j−1) or (i, j+1).

[Method 2] A time index of the PDCCH DMRS may be changed. For example, a position of the RE to which the PDCCH DMRS is mapped may be determined to be (i−1, j) or (i+1, j).

[Method 3] Time and frequency indexes of the PDCCH DMRS may be changed. For example, a position of the RE to which the PDCCH DMRS is mapped may be determined to be (i−1, j−1) or (i+1, j−1) or (i−1, j+1) or (i+1, j+1). The UE may monitor the PDCCH by assuming the changed position of the PDCCH DMRS.

According to $1\text{-}2^{nd}$ Embodiment of the disclosure, when a rate matching resource (e.g., REs corresponding to LTE CRS) overlaps a PDCCH DMRS, the UE may smoothly receive a PDCCH through a series of operations for protecting the PDCCH DMRS.

$1\text{-}3^{rd}$ Embodiment

In $1\text{-}3^{rd}$ Embodiment of the disclosure, a base station may configure a control resource set including non-contiguous symbols in a UE, and the UE may receive a PDCCH from the base station through the control resource set including the non-contiguous symbols. That is, the base station may configure a control resource set and a search space in the UE, by avoiding a resource region configured as a rate matching resource (e.g., time and frequency resources or symbols including REs in which an LTE CRS is transmitted).

In more detail, in FIG. 7, in a method of configuring a control resource set having a length of X symbols and a search space in an NR carrier overlapping the LTE carrier 702, the base station may configure a control resource set including symbols other than 0, 1, 4, 7, 8, and $11^{th}$ symbols on which an LTE CRS is transmitted, that is, 2, 3, 5, 6, 9, 10, 12, and $13^{th}$ symbols. For example, a control resource set having a length of 3 symbols may be configured to be monitored in 2, 3, and $5^{th}$ symbols.

As a method by which the base station configures a non-contiguous control resource set and a monitoring occasion in the UE or a method by which the UE monitors a PDCCH in a non-contiguous control resource set, a method corresponding to at least one or a combination of one or more of the following methods may be used.

[Method 1]

A base station may configure a non-contiguous control resource set by using a bitmap in a UE. In more detail, the base station may configure Y symbols as a duration of a control resource set in the UE and Y symbol positions by using an N-bit bitmap When a specific bit value of the bitmap indicates 1, the UE may assume that a symbol of the control resource set exists at a corresponding symbol position. For example, the base station may indicate three symbol positions corresponding to the control resource set in a slot, by additionally using a bitmap of N=14 (number of symbols per slot) bits for the control resource set having a length of Y=3 symbols to the UE. In FIG. 7, when the base station is to configure a control resource set including 2, 3, and $5^{th}$ symbols in the UE, the base station may indicate a configuration for the control resource set to the UE through a bitmap {0 0 1 1 0 1 0 0 0 0 0 0 0 0}. The size N of the bitmap may be configured by the base station in the UE through a bitmap having a pre-defined fixed value (e.g., 14 (corresponding to the number of symbols per slot) or 8 (corresponding to the number of remaining symbols other than symbols on which an LTE CRS of 4 ports in a subframe is transmitted). The UE may be configured with a control resource set from the base station as described above, and may monitor a PDCCH in the configured control resource set.

[Method 2]

A base station may configure a contiguous control resource set in a UE, and when the UE monitors the control resource set in a specific slot according to a search space configuration and some symbols of the control resource set overlap a rate matching resource, the UE may determine that symbols of the control resource set in the overlapping symbols are invalid (puncturing operation for the control resource set). That is, the UE may monitor a PDCCH by assuming a control resource set including remaining valid symbols other than the invalid symbols in the configured control resource set. That is, the base station may configure a control resource set having a length of Y symbols in the UE, and when Z symbols from among the symbols overlap a rate matching resource, the UE may monitor a PDCCH by assuming a control resource set having a length of X=Y−Z symbols in the control resource set. In detail, in FIG. 7, the base station may configure a control resource set having a length of Y=4 symbols in an NR carrier overlapping the LTE carrier 702 in the UE, and when the control resource set is configured to be monitored beginning from a second symbol in the slot 710, the UE may perform monitoring on {symbol #2, symbol #3, symbol #4, symbol #5} for the control resource set of four symbols. In this case, portions mapped to the symbol #4 from among the symbols of the control resource set overlap a CRS RE of the LTE carrier 702 (portions corresponding to a CRS port 0 720 and a CRS port 1 721 overlap). In this case, the UE may assume that the portions mapped to the symbol #4 from among the symbols of the control resource set is invalid, and thus, the UE may determine that only symbols mapped to {symbol #2, symbol #3, symbol #5} from among the symbols of the control resource set are valid. Accordingly, the UE may monitor a PDCCH by assuming a control resource set including {symbol #2, symbol #3, symbol #5}. When Method 2 is performed, a maximum number of symbols which may be determined by the UE to be valid may not exceed M (e.g., M=3).

[Method 3]

A base station may configure a contiguous control resource set in a UE, and when the UE monitors the control resource set in a specific slot according to a search space configuration and some symbols of the control resource set overlap a rate matching resource, the UE may determine that symbol positions of the control resource set in the overlapping symbols are changed (rate matching operation for the control resource set). Accordingly, the UE may monitor a PDCCH by assuming the control resource set whose symbol positions are changed. The base station may configure a control resource set having a length of Y symbols in the UE, and when the control resource set is configured to be monitored in $\{i, i+1, i+2, \ldots, i+Y-1\}^{th}$ symbols in a slot and the i+K0 symbol from among the symbols overlaps a rate matching resource, the UE may assume that positions of the $\{i+K, i+K+1, \ldots, i+Y-1\}^{th}$ symbols of the control resource set are changed. For example, the UE may assume that the $\{i+K, i+K+1, \ldots, i+Y-1\}^{th}$ symbols of the control resource set are changed to $\{i+K+d, i+K+1+d, \ldots, i+Y-1+d\}$. Here, d may be a pre-defined fixed value (e.g., d=1), may be configured by the base station in the UE, or may be implicitly determined by other system parameters. As a result, the UE may monitor a PDCCH in a control resource set in which symbol positions are changed to $\{i, i+1, i+2, \ldots, i+K-1, i+K+d, i+K+1+d, \ldots, i+Y-1+d\}$ for the control resource set. In detail, in FIG. 7, the base station may configure a control resource set having a length of Y=3 symbols in an NR carrier overlapping the LTE carrier 702 in the UE, and when the control resource set is configured to be monitored beginning from a second symbol in the slot 710, the UE may perform monitoring on {symbol #2, symbol #3, symbol #4} for the control resource set of three symbols. In this case, portions mapped to the symbol #4 from the among symbols of the control resource set overlap a CRS RE of the LTE carrier 702 (portions corresponding to the CRS port 0 720 and the CRS port 1 721 overlap). In this case, the UE may assume that the portions mapped to the symbol #4 from among the symbols of the control resource set are changed to symbol #5, and thus, the UE may assume that symbols to which the control resource set is mapped are changed to {symbol #2, symbol #3, symbol #5}. Accordingly, the UE may monitor a PDCCH by assuming a control resource set including {symbol #2, symbol #3, symbol #5}.

Some embodiments of the disclosure described above may be limitedly performed when the number of CRS ports of an LTE CRS pattern configured as a rate matching resource is greater than X (e.g., X=2).

Figure 9:
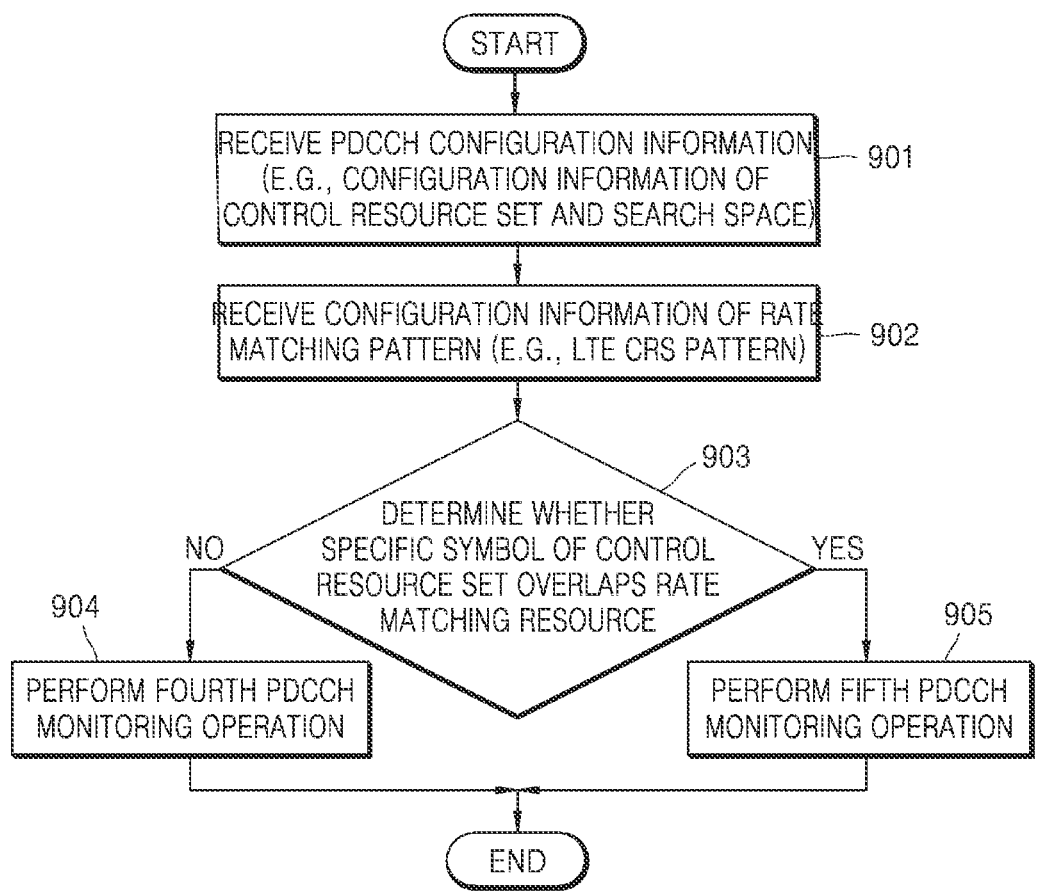
FIG. 9 is a diagram illustrating a UE operation, according to some embodiments of the disclosure.

FIG. 9 is a diagram illustrating a UE operation, according to some embodiments of the disclosure.

In operation 901, a UE may receive PDCCH configuration information from a base station. The PDCCH configuration information may include configuration information of a control resource set and a search space as described above. In operation 902, the UE may receive configuration information of a rate matching pattern from the base station. The configuration information of the rate matching pattern may include configuration information of an LTE CRS pattern as described above. In operation 903, the UE may determine whether REs in a specific symbol corresponding to a control resource set configured to be monitored in a specific slot based on a search space configuration overlap REs corresponding to a rate matching resource based on THE configuration information of the base station. When it is determined in operation 903 that the REs do not overlap, the UE may perform a "fourth PDCCH monitoring operation" in operation 904. The "fourth PDCCH monitoring operation" may include an operation of monitoring a PDCCH in the control resource set according to an existing base station configuration. When it is determined in operation 903 that the REs overlap, the UE may perform a "fifth PDCCH monitoring operation" in operation 905. The "fifth PDCCH monitoring operation" may include an operation corresponding to some methods (Method 2 or Method 3) of 1-3$^{rd}$ Embodiment.

According to 1-3$^{rd}$ Embodiment, because PDCCH transmission and reception is possible through a control resource set including contiguous symbols between the base station and the UE, a rate matching resource (e.g., REs corresponding to an LTE CRS) may be safely protected and PDCCH transmission and reception may be effectively performed.

1-4$^{th}$ Embodiment 1-4$^{th}$ Embodiment of the disclosure relates to a PDCCH monitoring method of a UE when a rate matching resource corresponding to one or more LTE CRS patterns is configured for the UE, and REs to which a PDCCH candidate group in a control resource set to be monitored by the UE is mapped overlap REs corresponding to the one or more LTE CRS patterns.

FIG. 8 is a diagram illustrating a UE operation, according to 1-4$^{th}$ Embodiment of the disclosure.

In operation 801, a UE may receive PDCCH configuration information from a base station. The PDCCH configuration information may include configuration information of a control resource set and a search space as described above. In operation 802, the UE may receive configuration information of a rate matching pattern from the base station. The configuration information of the rate matching pattern may include configuration information of one or more LTE CRS patterns. In operation 803, the UE may determine whether one or more REs to which a PDCCH candidate group in the search space is mapped overlap REs corresponding to the one or more LTE CRS patterns based on the configuration information of the base station.

When it is determined in operation 803 that the one or more REs to which the PDCCH candidate group in the search space is mapped do not overlap the REs corresponding to the one or more LTE CRS patterns, the UE may perform a "first PDCCH monitoring operation" in operation 804. The "first PDCCH monitoring operation" may include an operation of monitoring the PDCCH candidate group.

When it is determined in operation 803 that the one or more REs to which the PDCCH candidate group in the search space is mapped overlap the REs corresponding to the one or more LTE CRS patterns, the UE may determine whether the configuration information of the LTE CRS patterns satisfies a specific condition A in operation 805. The specific condition may be a condition corresponding to at least one or a combination of one or more of the following conditions.

[Condition 1]

A case where the number of LTE CRS ports (nrofCRS-Ports) is configured to be greater than X. X may be a value received from the base station, a value reported by the UE as capability to the base station, or a pre-defined fixed value (e.g., X=2).

[Condition 2]

A case where the number of LTE CRS ports of at least one LTE CRS pattern from among resources corresponding to the one or more LTE CRS patterns overlapping the REs corresponding to the control resource set including the PDCCH candidate group is configured to be greater than X. X may be a value received from the base station, a value reported by the UE as capability to the base station, or a pre-defined fixed value (e.g., X=2).

[Condition 3]

A case where the number of LTE CRS ports of all resources corresponding to the one or more LTE CRS patterns overlapping the REs corresponding to the control resource set including the PDCCH candidate group is configured to be greater than X. X may be a value received from the base station, a value reported by the UE as capability to the base station, or a pre-defined fixed value (e.g., X=2).

When it is determined in operation 805 that the configuration information of the LTE CRS does not satisfy the specific condition A, the UE may perform a "second PDCCH monitoring operation" in operation 806. The "second PDCCH monitoring operation" may include an operation of not monitoring the PDCCH candidate group or an operation of not expecting to perform monitoring. When it is determined in operation 805 that the configuration information of the LTE CRS satisfies the specific condition A, the UE may perform a "third PDCCH monitoring operation" in operation 807. The "third PDCCH monitoring operation" may include an operation corresponding to at least one or a combination of one or more of the following operations.

[Operation 1]

The UE may perform monitoring by assuming that REs overlapping the LTE CRS from among REs to which the PDCCH candidate group is mapped are rate matched.

[Operation 2]

The UE may perform monitoring by assuming that REs overlapping the LTE CRS from among REs to which the PDCCH candidate group is mapped are punctured.

[Operation 3]

The UE may perform monitoring by assuming that only REs corresponding to the number of ports greater than X from among REs corresponding to the LTE CRS from among REs to which the PDCCH candidate group is mapped are punctured or rate matched.

[Operation 4]

The UE may perform monitoring by assuming that only REs corresponding to the number of ports greater than X from among REs corresponding to the LTE CRS from among REs to which the PDCCH candidate group is mapped are punctured or rate matched. Also, the UE may not expect that the REs to which the PDCCH candidate group is mapped overlap REs corresponding to the number of ports less than X. When the UE receives a PDCCH related configuration and a rate matching resource configuration in which there exists a PDCCH candidate group overlapping the REs corresponding to the number of ports less than X, the UE may determine the configuration as an error.

[Operation 5]

The UE may perform monitoring by assuming that only REs corresponding to the number of ports greater than X from among REs corresponding to the LTE CRS, from among REs to which the PDCCH candidate group is mapped are punctured or rate matched. Also, when the REs to which the PDCCH candidate group is mapped overlap REs corresponding to the number of ports less than X, the UE may not monitor the PDCCH candidate group.

The UE may perform monitoring by assuming that only REs corresponding to the number of ports greater than X from among REs corresponding to the LTE CRS, from among REs to which the PDCCH candidate group is mapped are punctured or rate matched. Also, when the REs to which the PDCCH candidate group is mapped overlap REs corresponding to the number of ports less than X, the UE may not monitor the PDCCH candidate group.

According to 1-4$^{th}$ Embodiment of the disclosure, because the base station and the UE may still use a PDCCH candidate group overlapping a rate matching resource (e.g., REs corresponding to an LTE CRS) in transmission and reception according to a specific condition without dropping the PDCCH candidate group, PDCCH transmission and reception between the base station and the UE may be more smoothly performed.

Figure 10:
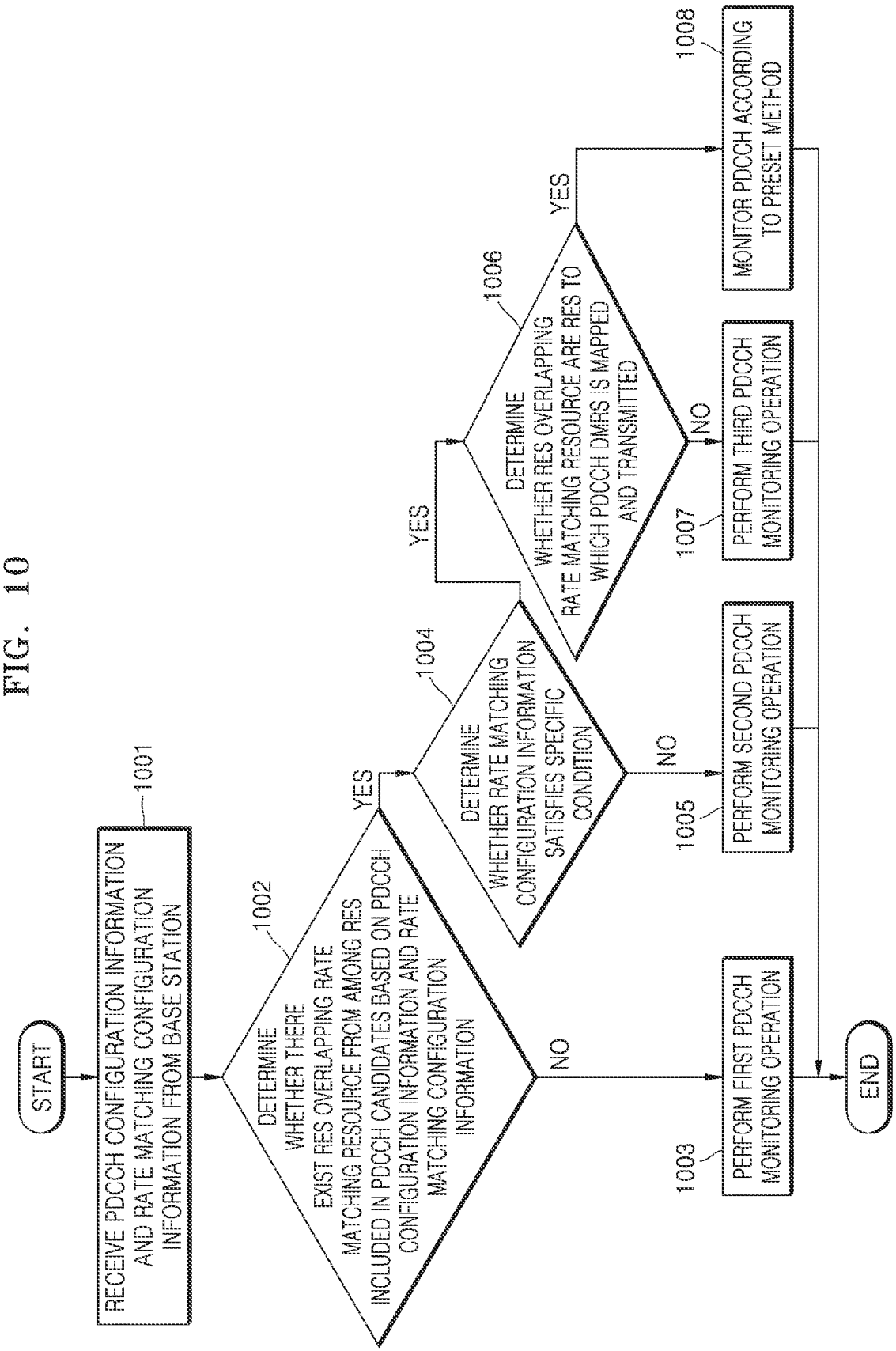
FIG. 10 is a flowchart for describing a method by which a UE monitors a physical downlink control channel (PDCCH) by considering a type of a PDCCH signal and a rate matching pattern, according to an embodiment of the disclosure.

FIG. 10 is a flowchart for describing a method by which a UE monitors a PDCCH by considering a type of a PDCCH signal and a rate matching pattern, according to an embodiment of the disclosure.

In operation 1001, a UE may receive PDCCH configuration information and rate matching configuration information from a base station. The PDCCH configuration information may include configuration information of a control resource set and a search space as described above. Also, the rate matching configuration information may include configuration information of an LTE CRS pattern. However, this is merely an example, and information included in the rate matching configuration information is not limited thereto.

In operation 1002, the UE may determine whether there exist REs overlapping a rate matching resource from among REs included in a PDCCH candidate group, based on the PDCCH configuration information and the rate matching configuration information.

In operation 1003, when there are no REs overlapping the rate matching resource from among the REs included in the PDCCH candidate group, the UE may perform a first PDCCH monitoring operation. The first PDCCH operation may include an operation of monitoring the PDCCH candidate group, as described above in 1-1$^{st}$ Embodiment.

In operation 1004, when there exist REs overlapping the rate matching resource from among the REs included in the PDCCH candidate group, the UE may determine whether the rate matching configuration information satisfies a specific condition. For example, the specific condition may be a case where the number of ports of a signal (e.g., an LTE CRS) transmitted through the rate matching resource is configured to be greater than X. However, this is merely an example, and the specific condition is not limited thereto.

In operation 1005, when it is determined that the rate matching configuration information does not satisfy the specific condition, the UE may perform a second PDCCH monitoring operation. The second PDCCH monitoring operation may include an operation of not monitoring the PDCCH candidate group or an operation of not expecting to perform monitoring, as described above in 1-1$^{st}$ Embodiment.

In operation 1006, when it is determined that the rate matching configuration information satisfies the specific condition, the UE may determine whether the REs overlapping the rate matching resource from among the REs included in the PDCCH candidate group are REs to which a PDCCH DMRS is mapped and transmitted.

In operation 1007, when it is determined that the REs overlapping the rate matching resource from among the REs included in the PDCCH candidate group are not REs to which the PDCCH DMRS is mapped and transmitted, the UE may perform a third PDCCH monitoring operation. The third PDCCH monitoring operation may correspond to at least one or a combination of one or more of Operations 1 through 5 described above in 1-1$^{st}$ Embodiment.

In operation 1008, when the REs overlapping the rate matching resource from among the REs included in the PDCCH candidate group are REs to which the PDCCH DMRS is mapped and transmitted, the UE may monitor the PDCCH DMRS, as described above in 1-2$^{nd}$ Embodiment.

According to an embodiment, when the REs overlapping the rate matching resource are REs to which the PDCCH DMRS is mapped and transmitted, the UE may monitor a PDCCH by assuming that a position of the PDCCH DMRS is changed. For example, when (time index, frequency index) of an RE to which the PDCCH DMRS is mapped is (i, j) and the RE overlaps the rate matching resource, a position of the RE to which the PDCCH DMRS is mapped may be changed, and the changed position may be determined by using a method corresponding to at least one or a combination of one or more of Method 1 through Method 3 of 1-2$^{nd}$ Embodiment.

According to another embodiment, when the REs overlapping the rate matching resource are REs to which the PDCCH DMRS is mapped and transmitted, the UE may monitor a PDCCH by assuming that the PDCCH DMRS is punctured.

According to another embodiment, when the REs overlapping the rate matching resource are REs to which the PDCCH DMRS is mapped and transmitted, whether the PDCCH DMRS is punctured may be determined based on a configuration of the base station. That is, the base station may configure whether the PDCCH DMRS REs overlapping the REs configured as the rate matching resource are punctured or are not punctured (mapped and transmitted as it is) in the UE through higher layer signaling. When the REs to which the PDCCH DMRS is mapped and transmitted overlap the REs configured as the rate matching resource, the UE may monitor the PDCCH by assuming that the PDCCH DMRS is punctured and may monitor the PDCCH or may monitor the PDCCH by assuming that the PDCCH DMRS is not punctured (assuming that the PDCCH DMRS is mapped and transmitted as it is).

Second Embodiment

A carrier aggregation and scheduling method in a 5G communication system will now be described in detail.

A UE may access a primary cell through initial access, and a base station may additionally configure one or more secondary cells in the UE. The UE may perform communication through serving cells including the primary cell and the secondary cells configured by the base station.

The base station may additionally configure whether to perform cross-carrier scheduling for the configured cells in the UE.

For convenience of explanation, when cross-carrier scheduling is configured, a cell that performs scheduling (i.e., a cell receiving downlink control information corresponding to downlink allocation or uplink grant) is referred to as a 'first cell', and a cell on which scheduling is performed (i.e., a cell in which downlink or uplink data is actually scheduled and transmitted and received, based on the downlink control information) is referred to as a "second cell". When the UE receives cross-carrier scheduling for a specific cell A (scheduled cell) from the base station (in this case, the cell A corresponds to the "second cell"), the UE may not perform PDCCH monitoring for the cell A in the cell A, and may perform monitoring in another cell B indicated by the cross-carrier scheduling, that is, a scheduling cell (in this case, the cell B corresponds to the "first cell"). To configure the cross-carrier scheduling in the UE, the base station may configure information about the "first cell" that performs scheduling on the "second cell" (e.g., a cell index of the cell corresponding to the "first cell"), a carrier indicator field (CIF) value for the "second cell", etc. For example, the following configuration information may be notified by the base station to the UE through higher layer signaling (e.g., RRC signaling).

TABLE 16

| | | |
|---|---|---|
| CrossCarrierSchedulingConfig ::= | SEQUENCE { | |
| schedulingCellInfo | CHOICE { | |
| own (self-carrier scheduling) | SEQUENCE { | -- No cross carrier scheduling |
| cif-Presence | BOOLEAN | |
| }, | | |
| other (cross-carrier scheduling) | SEQUENCE { | -- Cross carrier scheduling |
| schedulingCellId | ServCellIndex, | |
| (cell index of scheduling cell) | | |
| cif-InSchedulingCell | INTEGER (1..7) | |
| (CIF value) | | |
| } | | |
| }, | | |
| ... | | |
| } | | |

The UE may monitor a PDCCH for the cell configured by the cross-carrier scheduling in the cell corresponding to the "first cell". The UE may determine an index of a cell scheduled by received DCI from a carrier indicator field value in a DCI format, and may transmit and receive data in the cell indicated by a carrier indicator based on the index of the cell.

The scheduled cell (cell A) and the scheduling cell (cell B) may be configured to have different numerologies. The numerology may include a subcarrier spacing and a cyclic prefix. Assuming that the cell A and the cell B have different numerologies, when a PDCCH of the cell B schedules a PDSCH of the cell A, a minimum scheduling offset between the PDCCH and the PDSCH may be additionally considered as follows.

[Cross-Carrier Scheduling Method]

When a subcarrier spacing B of the cell B is less than a subcarrier spacing μA of the cell A, a PDSCH may be scheduled from a next PDSCH slot after X symbols from a last symbol of a PDCCH received by the cell B. Here, X may vary according to μB, and when μB=15 kHz, X=4 symbols; when μB=30 kHz, X=4 symbols; and when μB=60 kHz, X=8 symbols.

When the subcarrier spacing μB of the cell B is greater than the subcarrier spacing μA of the cell A, a PDSCH may be scheduled from a point of time after X symbols from a last symbol of a PDCCH received by the cell B. Here, X may vary according to μB, and when μB=30 kHz, X=4 symbols; when μB=60 kHz, X=8 symbols; and when μB=120 kHz, X=12 symbols.

In an embodiment of the disclosure, a base station may configure cross-carrier scheduling for a primary cell in a UE. That is, the base station may configure the primary cell in the UE by using the cross-carrier scheduling, and may configure a secondary cell performing scheduling on the primary cell. The UE may monitor and receive a downlink control channel including scheduling information for the primary cell corresponding to a "secondary cell" in the secondary cell corresponding to a "first cell" based on configuration information of the base station.

In an embodiment of the disclosure, when cross-carrier scheduling for a primary cell is configured, the UE may not perform monitoring on a search space set configured as a common search space configured in the primary cell. In addition, the UE may perform monitoring on the search space set configured as the common search space in a secondary cell configured to schedule the primary cell.

In an embodiment of the disclosure, when cross-carrier scheduling for a primary cell is configured, the UE may still perform monitoring on a search space set configured as all or some common search spaces configured in the primary cell. For example, at least one or more common search spaces from among the following common search spaces may not be monitored.

a Type0-PDCCH CSS set configured by pdcch-ConfigSIB1 in MIB or by searchSpaceSIB1 in PDCCHConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSystemInformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI or a TC-RNTI on the primary cell a Type2-PDCCH CSS set configured by pagingSearchSpace in PDCCH-ConfigCommon for a DCI format with CRC scrambled by a P-RNTI on the primary cell of the MCG In an embodiment of the disclosure, when cross-carrier scheduling for a primary cell is configured, the UE may still perform monitoring on a search space set configured as all or some common search spaces configured in the primary cell. For example, at least one or more common search spaces from among the following common search spaces may be monitored.

a Type0-PDCCH CSS set configured by pdcch-ConfigSIB1 in MIB or by searchSpaceSIB1 in PDCCHConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSystemInformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI or a TC-RNTI on the primary cell a Type2-PDCCH CSS set configured by pagingSearchSpace in PDCCH-ConfigCommon for a DCI format with CRC scrambled by a P-RNTI on the primary cell of the MCG a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s)

In an embodiment of the disclosure, when cross-carrier scheduling for a primary cell is configured, the UE may still perform monitoring on a search space set configured as all or some common search spaces configured in the primary cell. In this case, the UE may not perform monitoring on a DCI format in which a CRC is scrambled by a UE-specific RNTI in the common search spaces. In this case, the UE-specific RNTI may include at least one or more of the following RNTIs.

C-RNTI

MCS-C-RNTI

CS-RNTI(s)

Through Second Embodiment of the disclosure, when the coverage of a primary cell is not good, the UE may receive a downlink control channel through a secondary cell having relatively good coverage. Also, through Second Embodiment of the disclosure, when the demand for a downlink control channel of the primary cell is high, the demand may be offloaded to the secondary cell, thereby more smoothly transmitting and receiving the downlink control channel of the primary cell.

The above one or more embodiments may be implemented in combination.

Figure 11:
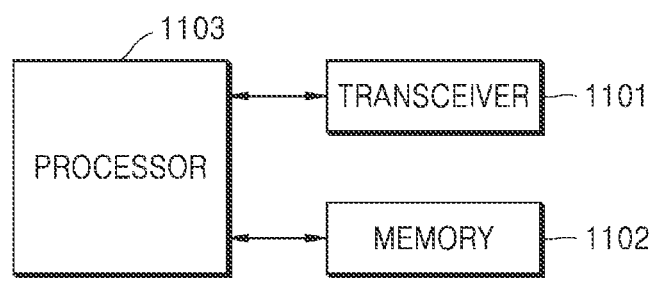
FIG. 11 is a diagram illustrating a structure of a UE, according to an embodiment of the disclosure.
Figure 12:
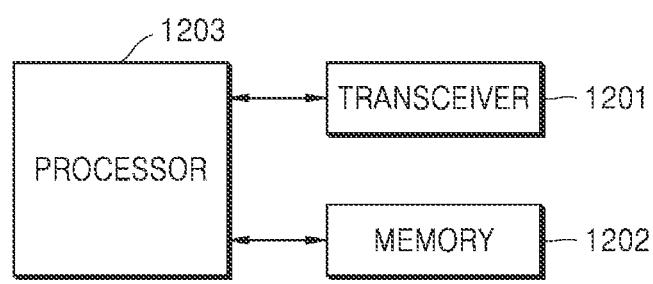
FIG. 12 is a diagram illustrating a structure of a base station, according to an embodiment of the disclosure.

In order to perform the above embodiments of the disclosure, a transceiver, a memory, and a processor of a UE and a base station are illustrated in FIGS. 11 and 12. In the above embodiments, a PDCCH repeated transmission configuration method and a PDCCH transmitting and receiving method of a base station and a UE for a multi-beam-based transmission and reception scheme are illustrated. To perform the methods, a transceiver, a memory, and a processor of the base station and the UE should operate according to the above embodiments.

FIG. 11 is a diagram illustrating a structure of a UE, according to an embodiment of the disclosure.

Referring to FIG. 11, a UE may include a transceiver 1101, a memory 1102, and a processor 1103. However, elements of the UE are not limited thereto. For example, the UE may include more or fewer elements than those illustrated in FIG. 11. Also, the transceiver 1101, the memory 1102, and the processor 1103 may be implemented as one chip.

According to an embodiment of the disclosure, the transceiver 1101 may transmit and receive a signal to and from a base station. The signal may include control information and data. To this end, the transceiver 1101 may include a radio frequency (RF) transmitter for up-converting and amplifying a frequency of a transmitted signal, and an RF receiver for low-noise amplifying and down-converting a frequency of a received signal. Also, the transceiver 1101 may receive a signal through a radio channel and may output the received signal to the processor 1103, and may transmit a signal output from the processor 1103 through the radio channel.

According to an embodiment of the disclosure, the memory 1102 may store a program and data required to operate the UE. Also, the memory 1102 may store control information or data included in a signal transmitted and received by the UE. The memory 1102 may include a storage medium such as a read-only memory (ROM), a random-access memory (RAM), a hard-disk, compact disc (CD)-ROM, or a digital versatile disc (DVD), or a combination thereof. Also, the memory 1102 may include a plurality of memories. According to an embodiment of the disclosure, the memory 1102 may store a program for controlling and receiving PDCCH monitoring of the UE.

According to an embodiment of the disclosure, the processor 1103 may control a series of processes so that the UE operates according to the above embodiments of the disclosure. For example, the processor 1103 may control monitoring of a downlink control channel according to embodiments of the disclosure.

In detail, the processor 1103 may control each element of the UE to receive PDCCH configuration information from the base station, monitor a PDCCH from the base station based on the PDCCH configuration information, and detect the PDCCH based on the monitoring.

Also, the processor 1103 may include a plurality of processors, and may execute a program stored in the memory 1102 to perform a method of controlling and receiving monitoring of a downlink control channel according to embodiments of the disclosure.

FIG. 12 is a diagram illustrating a structure of a base station, according to an embodiment of the disclosure.

Referring to FIG. 12, a base station may include a transceiver 1201, a memory 1202, and a processor 1203. However, elements of the base station are not limited thereto. For example, the base station may include more or fewer elements than those illustrated in FIG. 12. Also, the transceiver 1201, the memory 1202, and the processor 1203 may be implemented as one chip.

According to an embodiment of the disclosure, the transceiver 1201 may transmit and receive a signal to and from a UE. The signal may include control information and data. The transceiver 1201 may include an RF transmitter for up-converting and amplifying a frequency of a transmitted signal, and an RF receiver for low-noise amplifying and down-converting a frequency of a received signal. Also, the transceiver 1201 may receive a signal through a radio channel and may output the received signal to the processor 1203, and may transmit a signal output from the processor 1203 through the radio channel.

According to an embodiment of the disclosure, the memory 1202 may store a program and data required to operate the base station. Also, the memory 1202 may store control information or data included in a signal transmitted and received by the base station. The memory 1202 may include a storage medium such as a ROM, a RAM, a hard-disk, a CD-ROM, or a DVD, or a combination thereof. Also, the memory 1202 may include a plurality of memories. According to an embodiment of the disclosure, the memory 1202 may store a method of controlling monitoring of a downlink control channel of the UE by the base station and a program for generating and transmitting a downlink control channel.

According to an embodiment of the disclosure, the processor 1203 may control a series of processes so that the base station operates according to the above embodiments of the disclosure. For example, the processor 1203 may control each element of the base station to control monitoring of a downlink control channel of the UE and generate and transmit a downlink control channel.

Also, the processor 1203 may include a plurality of processors, and may execute a program stored in the memory 1202, to perform a method of controlling monitoring of a downlink control channel of the UE and a method of generating and transmitting a downlink control channel according to embodiments of the disclosure.

Methods according to the claims or embodiments of the disclosure described herein may be implemented by hardware, software, or a combination of hardware and software.

When the methods are implemented as software, a computer-readable storage medium or a computer program product storing one or more programs (software modules) may be provided. The one or more programs that are stored in the computer-readable storage medium or the computer program product are configured to be executable by one or more processors in an electronic device. The one or more programs include instructions for allowing the electronic device to execute the methods according to the claims or the embodiments of the disclosure.

The programs (e.g., software modules or software) may be stored in a non-volatile memory including a random access memory (RAM) or a flash memory, a read-only memory (ROM), an electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in a memory including any combination of some or all of the above storage media. Also, each of the memories may include a plurality of memories.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may access, via an external port, the electronic device for performing embodiments of the disclosure. Furthermore, an additional storage device on the communication network may access the electronic device for performing embodiments of the disclosure.

In the afore-described embodiments of the disclosure, elements included in the disclosure are expressed in a singular or plural form according to the embodiments of the disclosure. However, the singular or plural form is selected appropriately for a condition provided for convenience of explanation, and the disclosure is not limited to the singular or plural form. An element expressed in a singular form may include a plurality of elements and elements expressed in a plural form may include a single element.

It should be understood that the embodiments of the disclosure described herein should be considered in a descriptive sense only and not for purposes of limitation. That is, it will be understood by one of ordinary skill in the art that various changes in form and details may be made in the embodiments of the disclosure without departing from the spirit and scope of the disclosure. Also, the embodiments may be combined with each other as required. For example, portions of an embodiment and another embodiment of the disclosure may be combined with each other and a base station and a UE may be used. Also, the embodiments of the disclosure may be applied to other communication systems, and other modifications may be made therein based on the spirit of the above embodiments. For example, the embodiments may also be applied to LTE systems, and 5G or NR systems.

The invention claimed is:

1. A method by which a terminal performs communication in a wireless communication system, the method comprising:
receiving physical downlink control channel (PDCCH) configuration information and rate matching configuration information from a base station;
based on the PDCCH configuration information and the rate matching configuration information, identifying resource elements (REs) overlapping a rate matching resource from among REs included in PDCCH candidates; and
based on whether a number of ports of signals transmitted via the rate matching resource exceeds a preset value, monitoring a PDCCH candidate comprising the identified REs from among the PDCCH candidates.

2. The method of claim 1, wherein the monitoring of the PDCCH candidate comprising the identified REs comprises:
when the number of ports of signals transmitted through the rate matching resource exceeds the preset value, determining that REs overlapping the rate matching resource from among REs included in the PDCCH candidate are punctured REs; and
monitoring REs other than the punctured REs from among the REs included in the PDCCH candidate.

3. The method of claim 1, wherein the monitoring of the PDCCH candidate comprising the identified REs comprises:
determining that REs overlapping the rate matching resource from among REs included in the PDCCH candidate are rate matched REs; and
monitoring REs other than the rate matched REs from among the REs included in the PDCCH candidate.

4. The method of claim 1, wherein the monitoring of the PDCCH candidate comprising the identified REs comprises:
when the number of ports of signals transmitted through the rate matching resource exceeds the preset value, determining that REs having a number of ports exceeding the preset value from among REs overlapping the rate matching resource are punctured REs or rate matched REs; and
monitoring REs other than the punctured REs or the rate matched REs from among REs included in the PDCCH candidate.

5. The method of claim 1, further comprising,
when the number of ports of signals transmitted through the rate matching resource exceeds the preset value, determining whether REs having a number of ports not exceeding the preset value from among REs of the PDCCH candidate overlap the rate matching resource,
wherein, when the REs having the number of ports not exceeding the preset value from among the REs of the PDCCH candidate overlap the rate matching resource, the monitoring of the PDCCH candidate is not performed.

6. The method of claim 1, further comprising determining whether a PDCCH signal mapped to the identified REs is a demodulation reference signal (DMRS),
wherein the monitoring comprises:
when the PDCCH signal mapped to the identified REs is the DMRS and the number of ports of signals transmitted through the rate matching resource exceeds the preset value, determining changed positions of the REs to which the DMRS is mapped; and
monitoring the DMRS in the REs on the changed positions.

7. The method of claim 6, wherein the determining of the changed positions of the REs to which the DMRS is mapped comprises changing at least one of a time index and a frequency index indicating positions of the REs to which the DMRS is mapped, according to a preset value.

8. A terminal for performing communication in a wireless communication system, the terminal comprising:
a transceiver; and
at least one processor,
wherein the at least one processor is configured to
receive physical downlink control channel (PDCCH) configuration information and rate matching configuration information from a base station, through the transceiver,
identify resource elements (REs) overlapping a rate matching resource from among REs included in PDCCH candidates, based on the PDCCH configuration information and the rate matching configuration information, and
monitor a PDCCH candidate comprising the identified REs from among the PDCCH candidates, based on whether a number of ports of signals transmitted via the rate matching resource exceeds a preset value.

9. The terminal of claim 8, wherein the at least one processor is further configured to,
when the number of ports of signals transmitted through the rate matching resource exceeds to the preset value, determine that REs overlapping the rate matching resource from among REs included in the PDCCH candidate are punctured REs, and
monitor REs other than the punctured REs from among the REs included in the PDCCH candidate.

10. The terminal of claim 8, wherein the at least one processor is further configured to
determine that REs overlapping the rate matching resource from among REs included in the PDCCH candidate are rate matched REs, and
monitor REs other than the rate matched REs from among the REs included in the PDCCH candidate.

11. The terminal of claim 8, wherein the at least one processor is further configured to,
when the number of ports of signals transmitted through the rate matching resource exceeds the preset value, determine that REs having a number of ports exceeding the preset value from among REs overlapping the rate matching resource are punctured REs or rate matched REs, and
monitor REs other than the punctured REs or the rate matched REs from among REs included in the PDCCH candidate.

12. The terminal of claim 8, wherein the at least one processor is further configured to,
when the number of ports of signals transmitted through the rate matching resource exceeds the preset value, determine whether REs having a number of ports not exceeding the preset value from among REs of the PDCCH candidate overlap the rate matching resource, and when the REs having the number of ports not exceeding the preset value from among the REs of the PDCCH candidate overlap the rate matching resource, not monitor the PDCCH candidate.

13. The terminal of claim 8, wherein the at least one processor is further configured to,
  determine whether a PDCCH signal mapped to the identified REs is a demodulation reference signal (DMRS),
  when the PDCCH signal mapped to the identified REs is the DMRS and the number of ports of signals transmitted through the rate matching resource exceeds the preset value, determine changed positions of the REs to which the DMRS is mapped, and
  monitor the DMRS in the REs on the changed positions.

14. The terminal of claim 13, wherein the at least one processor is further configured to
  change at least one of a time index and a frequency index indicating positions of the REs to which the DMRS is mapped, according to a preset value.

15. A base station for performing communication in a wireless communication system, the base station comprising:
  a transceiver; and
  at least one processor,
  wherein the at least one processor is configured to
  identify resource elements (REs) overlapping a rate matching resource from among REs included in PDCCH candidates,
  determine a PDCCH candidate comprising the identified REs from among the PDCCH candidates, based on whether a number of ports of signals transmitted through the rate matching resource exceeds a preset value, and
  transmit a PDCCH signal through the transceiver, based on REs other than the identified REs from among REs included in the PDCCH candidate.

* * * * *